(12) United States Patent
Piao

(10) Patent No.: US 11,527,090 B2
(45) Date of Patent: Dec. 13, 2022

(54) INFORMATION PROCESSING APPARATUS, CONTROL METHOD, AND NON-TRANSITORY STORAGE MEDIUM

(71) Applicant: NEC Corporation, Tokyo (JP)

(72) Inventor: Jun Piao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/258,599

(22) PCT Filed: Jul. 18, 2018

(86) PCT No.: PCT/JP2018/026919
§ 371 (c)(1),
(2) Date: Jan. 7, 2021

(87) PCT Pub. No.: WO2020/016963
PCT Pub. Date: Jan. 23, 2020

(65) Prior Publication Data
US 2021/0166012 A1 Jun. 3, 2021

(51) Int. Cl.
| | | |
|---|---|---|
| G06V 40/10 | (2022.01) | |
| G06T 7/70 | (2017.01) | |
| G06K 9/62 | (2022.01) | |
| G06V 10/44 | (2022.01) | |
| G06V 10/46 | (2022.01) | |

(52) U.S. Cl.
CPC .......... *G06V 40/10* (2022.01); *G06K 9/6215* (2013.01); *G06T 7/70* (2017.01); *G06V 10/443* (2022.01); *G06V 10/462* (2022.01); *G06T 2207/30196* (2013.01)

(58) Field of Classification Search
None
See application file for complete search history.

(56) References Cited

U.S. PATENT DOCUMENTS 9,480,417 B2 * 11/2016 Kawaguchi .......... A61B 5/1128
2010/0086213 A1 * 4/2010 Momoi ................ G06V 40/103
382/195

(Continued)

FOREIGN PATENT DOCUMENTS

JP    2010-086482 A    4/2010
JP    2013-065156 A    4/2013

(Continued)

OTHER PUBLICATIONS

International Search Report for PCT Application No. PCT/JP2018/026919, dated Oct. 16, 2018.

(Continued)

*Primary Examiner* — Delomia L Gilliard

(57) ABSTRACT

An information processing apparatus (2000) detects an estimation position (24), which is a position where a target object is estimated to be present, from a captured image (20) generated by a camera (10). The target object is a belonging of a person. The information processing apparatus (2000) detects a plurality of parts (22) constituting a body of a person included in the captured image (20). For example, the parts (22) are joints. The information processing apparatus (2000) detects the estimation position (24) of the target object in the captured image (20) using information relating to a position of each of a plurality of the detected parts (22).

14 Claims, 20 Drawing Sheets

(56) References Cited

U.S. PATENT DOCUMENTS

| | | | |
|---|---|---|---|
| 2013/0155229 A1* | 6/2013 | Thornton | G06V 20/52 |
| | | | 348/143 |
| 2013/0182962 A1* | 7/2013 | Hirakawa | G06T 7/12 |
| | | | 382/199 |
| 2014/0071308 A1* | 3/2014 | Cieplinski | G06T 11/203 |
| | | | 348/222.1 |
| 2018/0165813 A1* | 6/2018 | Mai | G06V 40/103 |

FOREIGN PATENT DOCUMENTS

| | | | |
|---|---|---|---|
| JP | 2013065156 A | * | 4/2013 |
| JP | 2017-016344 A | | 1/2017 |
| WO | 2012/036306 A1 | | 3/2012 |

OTHER PUBLICATIONS

Zhe Cao and three others, "Realtime Multi-Person 2D Pose Estimation using Part Affinity Fields", CoRR, Nov. 24, 2016.

Riza Alp Guler and two others, "DensePose: Dense Human Pose Estimation In The Wild", CoRR, Feb. 1, 2018.

Haoshu Fang and two others, "RMPE: Regional Multi-person Pose Estimation", CoRR, Dec. 1, 2016.

* cited by examiner

PART INFORMATION  F = (P₁, P₂,...)

PART INFORMATION $F = (v_1, v_2, ...)$

PART INFORMATION $F = (\alpha_1, \alpha_2, ...)$

PART INFORMATION $F = (\beta_1, \beta_2, ...)$

CANDIDATE REGION 26-1 INCLUDING ESTIMATION
POSITION IS DETERMINED AS OBJECT REGION 30

FIRST SCORE: 3 (NUMBER OF ESTIMATION POSITIONS 24)
OR
3/S (NUMBER OF ESTIMATION POSITIONS 24
/ AREA OF CANDIDATE REGION 22)

INFORMATION PROCESSING APPARATUS, CONTROL METHOD, AND NON-TRANSITORY STORAGE MEDIUM

This application is a National Stage Entry of PCT/JP2018/026919 filed on Jul. 18, 2018, the contents of all of which are incorporated herein by reference, in their entirety.

TECHNICAL FIELD

The present invention relates to object recognition.

BACKGROUND ART

A technique that detects an object from a captured image generated by a camera has been developed. For example, Patent Document 1 discloses an apparatus that detects a plurality of objects from a captured image and associates the detected objects. Specifically, in a case where an object (for example, a bag) and a plurality of persons are included in the captured image, the apparatus of Patent Document 1 associates the object and a person who is an owner.

Thus, the apparatus of Patent Document 1 performs connection using a connection relationship defined in advance while recognizing parts of the body of a person in order. For example, recognition and connection are performed in an order of face→neck→body→arm. In addition, the apparatus of Patent Document 1 performs recognition of an object defined in advance as an object frequently present around a recognized part. For example, a bag is defined as an object frequently present around an arm. For this reason, recognition of a bag is performed with recognition of an arm of a person as described above. As a result, it is understood that connection is made like "face→neck→body→arm→bag". Now, the apparatus of Patent Document 1 performs association of the connected face and bag (that is, association of the person and the bag).

Here, in Patent Document 1, for an object frequently present around a part of the body of a person, information for inferring around where the object is roughly present with respect to the part is defined. Then, Patent Document 1 describes that an image region where an object is to be recognized should be limited using such information. For example, the apparatus of Patent Document 1 detects an arm of a person according to the above-described flow, and then, limits an image region, in which a bag is to be recognized, using information indicating around where the bag is roughly present with respect to the arm of the person. Then, the bag is recognized for the limited image region.

RELATED DOCUMENTS

Patent Document

[Patent Document 1] Japanese Patent Application Publication No. 2010-086482

Non-Patent Documents

[Non-Patent Document 1] Zhe Cao and three others, "Real-time Multi-Person 2D Pose Estimation using Part Affinity Fields", CoRR, Nov. 24, 2016
[Non-Patent Document 2] Riza Alp Guler and two others, "DensePose: Dense Human Pose Estimation In The Wild", CoRR, Feb. 1, 2018
[Non-Patent Document 3] Haoshu Fang and two others, "Regional Multi-person Pose Estimation", CoRR, 2016

SUMMARY OF THE INVENTION

Technical Problem

In the technique of Patent Document 1, a part of the body of a person and an object present around the part are associated with each other on a one-to-one basis. Then, on an assumption that the part of the body of the person is recognized, the object associated with the part is recognized. For this reason, in a case where a part is not recognized, an object associated with the part cannot be recognized. For example, in the above-described example, in a case where the arm is not recognized, the bag cannot be recognized.

In this respect, the whole body of the person is not always included in the captured image. For example, in a case where an obstacle stands in front of the arm of the person or the arm of the person is outside an imaging range of a camera, the arm of the person is not recognized from a captured image. For this reason, the bag becomes unable to be recognized.

The present invention has been accomplished in view of the above-described problem, and provides a technique that detects a belonging of a person from a captured image with high accuracy.

Solution to Problem

An information processing apparatus of the present invention includes 1) a part detection unit that detects a plurality of parts constituting a body of a person included in a captured image, and 2) an estimation position detection unit that detects an estimation position of a target object in the captured image using information relating to a position of each of the plurality of detected parts.

A control method of the present invention is a control method that is executed by a computer. The control method includes 1) a part detection step of detecting a plurality of parts constituting a body of a person included in a captured image, and 2) an estimation position detection step of detecting an estimation position of a target object in the captured image using information relating to a position of each of the plurality of detected parts.

A program of the present invention causes a computer to execute each step of the control method of the present invention.

Advantageous Effects of Invention

According to the present invention, a technique that detects a belonging of a person from a captured image with high accuracy is provided.

BRIEF DESCRIPTION OF THE DRAWINGS

The above-described object and other objects, features, and advantages will become apparent from preferable example embodiments described below and the accompanying drawings.

DESCRIPTION OF EMBODIMENTS

Figure 1:
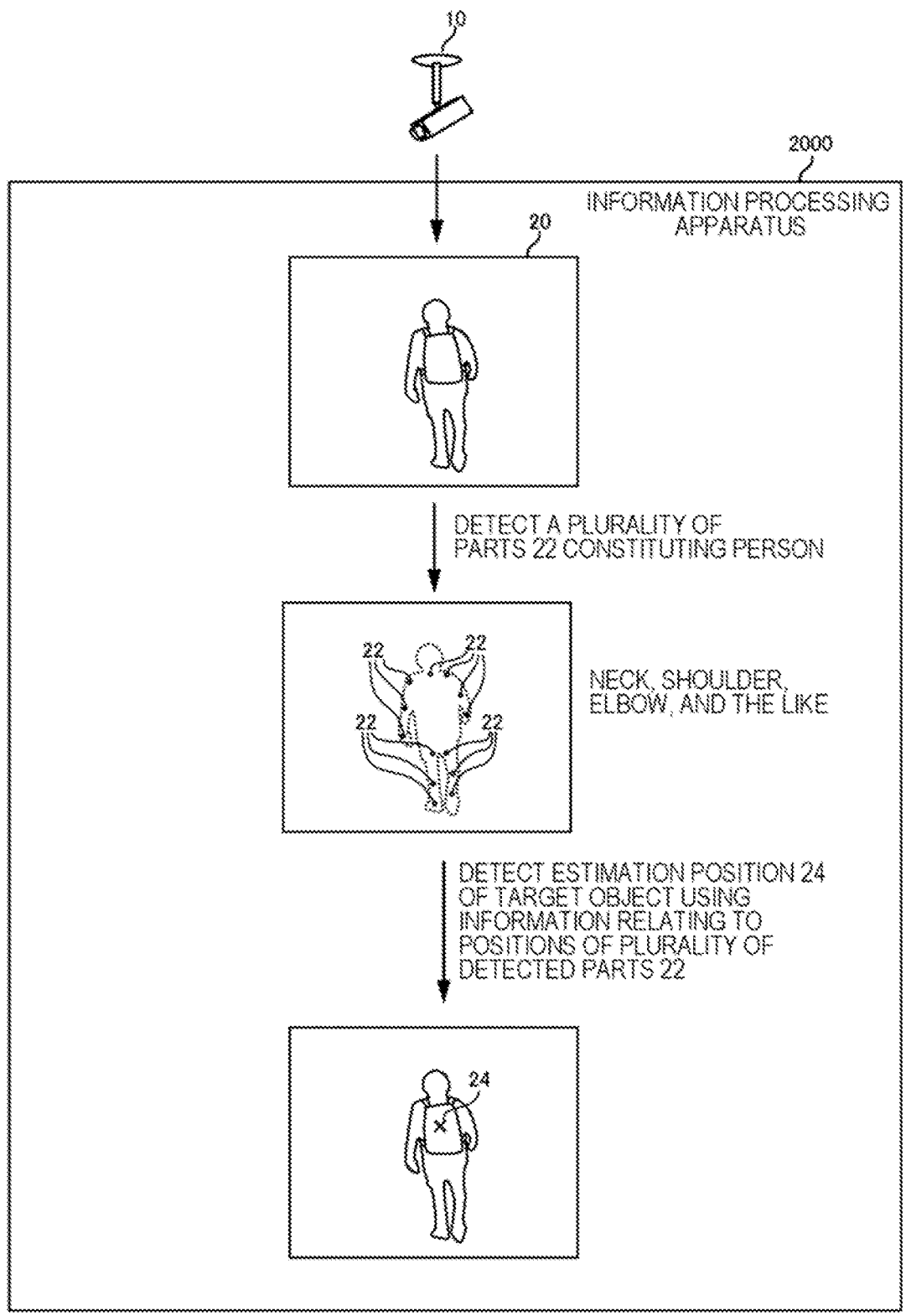
FIG. 1 is a diagram conceptually showing processing that is executed by an information processing apparatus of a present example embodiment.

Hereinafter, example embodiments of the present invention will be described referring to the drawings. In all drawings, the same components are represented by the same reference numerals, and description thereof will not be repeated. In respective block diagrams, except for a case where particular description is provided, each block is not a configuration of a hardware unit but a configuration of a function unit.

Example Embodiment 1

<Outline>

FIG. 1 is a diagram conceptually showing processing that is executed by an information processing apparatus 2000 of the present example embodiment. The information processing apparatus 2000 detects an estimation position 24, which is a position where a target object is estimated to be present, from a captured image 20 generated by a camera 10. The target object is a belonging of a person. Note that the term "a belonging of a person" used herein is not limited to an object (a handbag, a cane, or the like) that is held by a person with a hand, and generally includes an object that is carried with a person in any form. For example, the belonging of the person includes an object (a shoulder bag or the like) that a person hangs on a shoulder, an object (an identification card or the like) that a person hangs from the neck, an object (a rucksack or the like) that a person carries on the back, an object (a hat, a helmet, or the like) that a person wears on the head, an object (glasses, sunglasses, or the like) that a person wears on the face, an object (a watch or the like) that a person wears on a hand, or the like.

The information processing apparatus 2000 detects a plurality of parts 22 constituting the body of a person included in the captured image 20. For example, the parts 22 are joints. Then, the information processing apparatus 2000 detects the estimation position 24 of the target object in the captured image 20 using information relating to a position of each of a plurality of detected parts 22. The estimation position 24 may be one point, may be a plurality of points, or may be an image region having a size.

<Operations and Effects>

For the belongings of the person, a relative positional relationship with a plurality of parts 22 constituting the body of the person can be predicted. For example, it is considered that a position of a rucksack is predicted using a positional relationship of a neck, a shoulder, and a waist. Now, the information processing apparatus 2000 detects a plurality of parts 22 of the person from the captured image 20 and detects the estimation position 24 of the target object using the positional relationship of a plurality of detected parts 22. The position of the target object is presumed using the positional relationship with a plurality of parts 22 in this way, whereby it is possible to presume the position of the target object with high accuracy compared to a method that presumes the position of the target object using a positional relationship with one specific part.

In a case where a position of a belonging is predicted using the positional relationship of a plurality of parts of the person in this way, even though some parts cannot be detected from the captured image 20, it is possible to predict the position of the target object to some extent using the positional relationship of the parts that can be detected. For example, it is assumed that the position of the rucksack is predicted using a positional relationship of a neck, right and left shoulders, and right and left waists. In this case, even though some parts, such as the left shoulder, cannot be detected, it is possible to predict the position of the rucksack using the positional relationship of other parts, such as the neck, the right shoulder, and the right and left waists. From such a viewpoint, with the information processing apparatus 2000 of the present example embodiment, it is possible to presume the position of the target object with robustness against noise and with high accuracy compared to a method that presumes the position of the target object using a positional relationship with one specific part.

Note that the above description referring to FIG. 1 is for illustration for ease of understanding of the information processing apparatus 2000, and is not intended to limit the functions of the information processing apparatus 2000. Hereinafter, the information processing apparatus 2000 of the present example embodiment will be described in more detail.

<Example of Functional Configuration of Information Processing Apparatus 2000>

Figure 2:
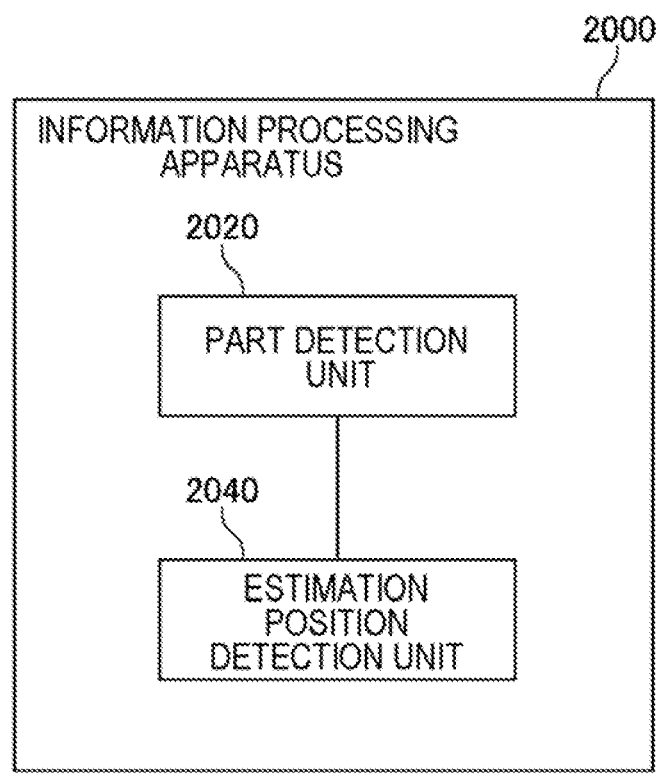
FIG. 2 is a diagram illustrating the functional configuration of an information processing apparatus of Example Embodiment 1.

FIG. 2 is a diagram illustrating the functional configuration of the information processing apparatus 2000 of Example Embodiment 1. The information processing apparatus 2000 has a part detection unit 2020 and an estimation position detection unit 2040. The part detection unit 2020 detects a plurality of parts 22 constituting the body of the person included in the captured image 20. The estimation position detection unit 2040 detects the estimation position 24 of the target object carried with the person included in the captured image 20 using information relating to the position of each of a plurality of detected parts 22.

<Hardware Configuration of Information Processing Apparatus 2000>

Each functional component of the information processing apparatus 2000 may be implemented by hardware (for example, a hard-wired electronic circuit or the like) that implements each functional component or may be implemented by a combination of hardware and software (for example, a combination of an electronic circuit and a program that controls the electronic circuit, or the like). Hereinafter, a case where each functional component of the information processing apparatus 2000 is implemented by a combination of hardware and software will be further described.

Figure 3:
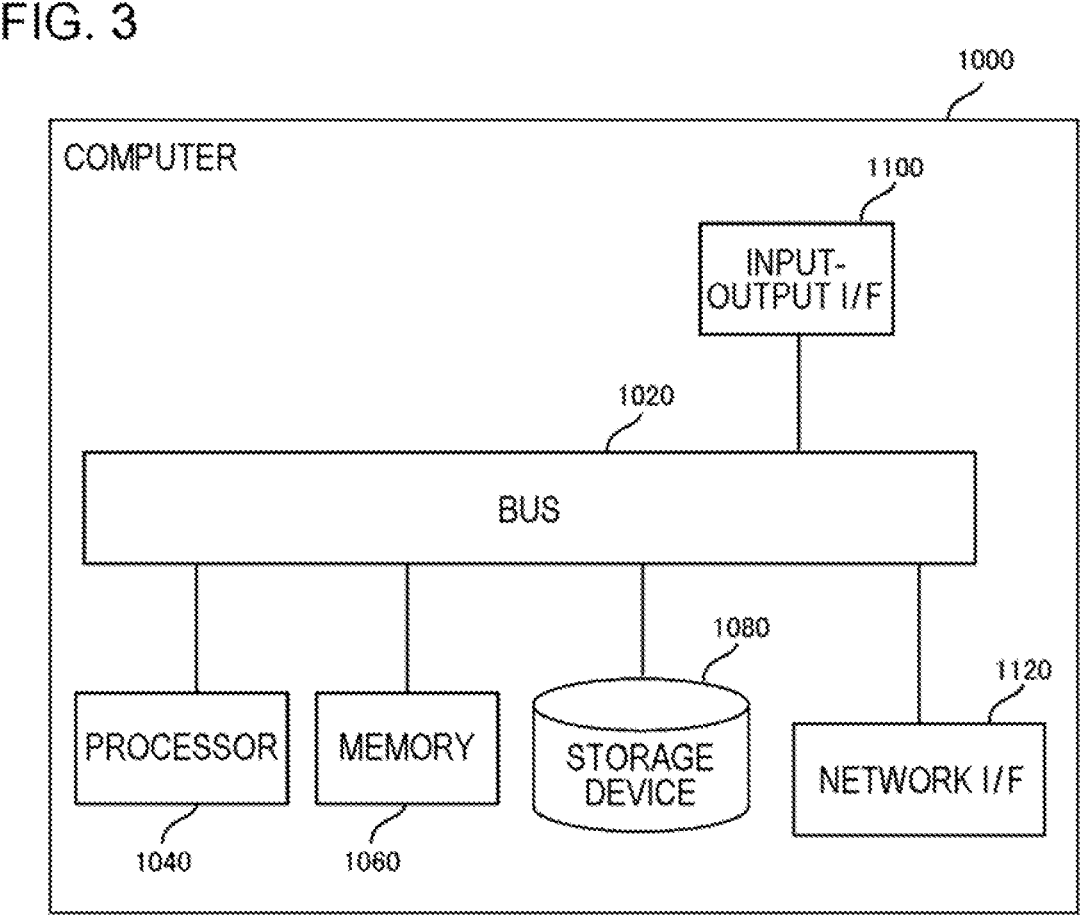
FIG. 3 is a diagram illustrating a computer for implementing the information processing apparatus.

FIG. 3 is a diagram illustrating a computer 1000 for implementing the information processing apparatus 2000. The computer 1000 is any computer. For example, the computer 1000 is a stationary computer, such as a personal computer (PC) or a server machine. In addition, for example, the computer 1000 is a portable computer, such as a smartphone or a tablet terminal. Moreover, for example, the computer 1000 may be the camera 10 that generates the captured image 20. The computer 1000 may be a dedicated computer designed in order to implement the information processing apparatus 2000 or may be a general-purpose computer.

The computer 1000 has a bus 1020, a processor 1040, a memory 1060, a storage device 1080, an input-output interface 1100, and a network interface 1120. The bus 1020 is a data transmission path through which the processor 1040, the memory 1060, the storage device 1080, the input-output interface 1100, and the network interface 1120 transmit and receive data from one another. However, a method of connecting the processor 1040 and the like to one another is not limited to bus connection.

A processor 1040 is various processors, such as a central processing unit (CPU), a graphics processing unit (GPU), and a field-programmable gate array (FPGA). A memory 1060 is a main storage apparatus that is implemented using a random access memory (RAM) or the like. A storage device 1080 is an auxiliary storage apparatus that is implemented using a hard disk, a solid state drive (SSD), a memory card, or a read only memory (ROM).

The input-output interface 1100 is an interface that connects the computer 1000 and an input-output device. For example, an input device, such as a keyboard, or an output device, such as a display apparatus, is connected to the input-output interface 1100. The network interface 1120 is an interface that connects the computer 1000 to a communication network. The communication network is, for example, a local area network (LAN) or a wide area network (WAN). A method in which the network interface 1120 is connected to the communication network may be wireless connection or may be wired connection.

The storage device 1080 stores a program module that implements each functional component of the information processing apparatus 2000. The processor 1040 reads each program module to the memory 1060 and executes each program module, thereby implementing a function corresponding to each program module.

<Camera 10>

The camera 10 is any imaging apparatus that performs imaging and generates image data as a result of imaging. For example, the camera 10 is a surveillance camera that is provided at a surveillance location.

As described above, the computer 1000 that implements the information processing apparatus 2000 may be the camera 10. In this case, the camera 10 analyzes the captured image generated by the camera 10 itself, thereby determining the object region 30. As the camera having such a function, for example, a camera, called an intelligent camera, a network camera, or an Internet protocol (IP) camera, can be used.

<Use Example of Information Processing Apparatus 2000>

The information processing apparatus 2000 can be used in any scene where processing of "detecting a predetermined object from image data generated by the camera" is useful. For example, the information processing apparatus 2000 is used for analysis of surveillance video generated by a surveillance camera. In this case, the camera 10 is a surveillance camera that generates surveillance video. The captured image 20 is a video frame constituting the surveillance video.

The information processing apparatus 2000 detects an estimation position of a predetermined object from the video frame constituting the surveillance video. With this, it is possible to recognize the presence of the target object at the surveillance location and the estimation position of the target object. Furthermore, the person that carries the target object can also be detected.

More specifically, with the information processing apparatus 2000, the presence of a dangerous object can be recognized using the surveillance video or the presence of a suspicious person (a person who carries a dangerous object or a person who hides a face behind sunglasses, a helmet, or the like) can be recognized using the surveillance video. Furthermore, in a case where a left-behind object is found at a facility under surveillance, past surveillance video generated by surveillance cameras provided at various locations of the facility is analyzed by the information processing apparatus 2000, whereby determination of a route along which the left-behind object is carried, detection of a person who carries the left-behind object, or the like can also be performed.

<Flow of Processing>

Figure 4:
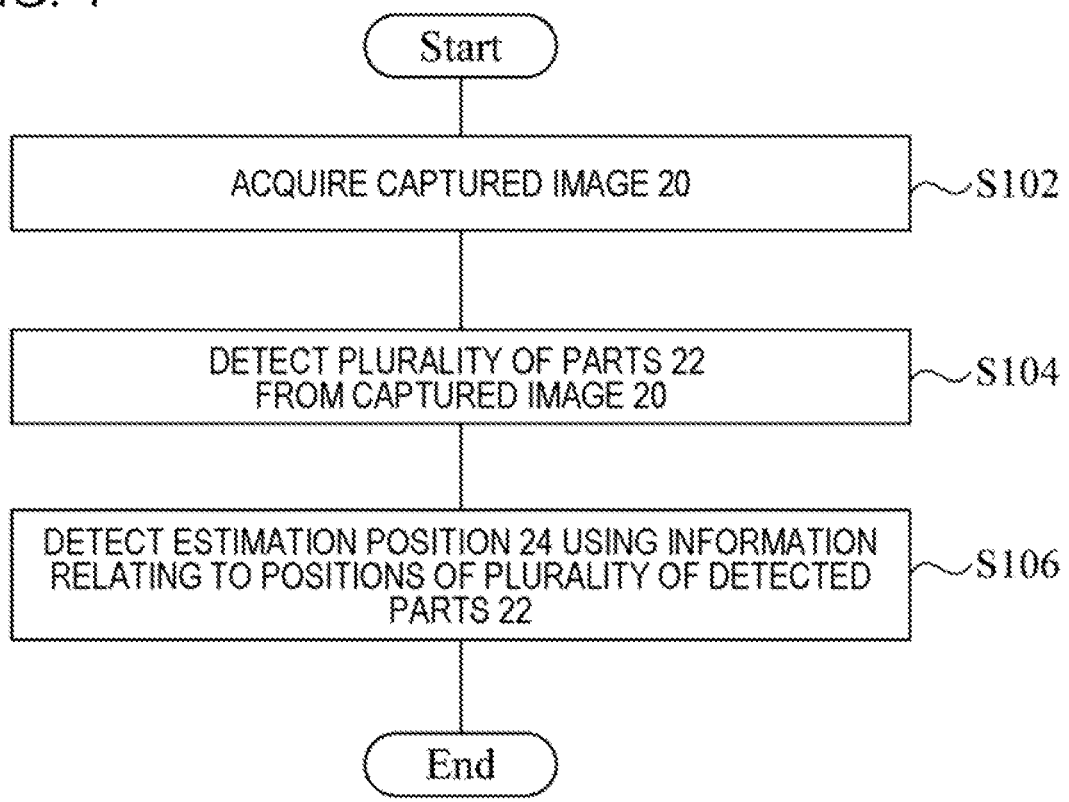
FIG. 4 is a flowchart illustrating a flow of processing that is executed by the information processing apparatus of Example Embodiment 1.

FIG. 4 is a flowchart illustrating a flow of processing that is executed by the information processing apparatus 2000 of Example Embodiment 1. The information processing apparatus 2000 acquires the captured image 20 (S102). The part detection unit 2020 detects a plurality of parts 22 constituting a target person from the captured image 20 (S104). The estimation position detection unit 2040 detects the estimation position 24 using information relating to the positions of a plurality of detected parts 22 (S106).

A timing at which the information processing apparatus 2000 executes a series of processing shown in FIG. 4 varies. For example, the information processing apparatus 2000 acquires the captured image 20 and executes a series of processing shown in FIG. 4 each time the captured image 20 is generated by the camera 10. In addition, for example, the information processing apparatus 2000 collectively acquires a plurality of captured images 20 generated by the camera 10 at a predetermined timing and executes a series of processing shown in FIG. 4 on each captured image 20 (so-called, batch processing). Moreover, for example, the information processing apparatus 2000 receives an input operation to specify the captured image 20 and executes a series of processing on the specified captured image 20.

<Acquisition of Captured Image 20: S102>

The information processing apparatus 2000 acquires the captured image 20 (S102). The captured image 20 may be image data itself generated by the camera 10 or may be image data obtained by executing any processing (for example, tone correction, trimming, or the like) on image data generated by the camera 10.

As a method in which the information processing apparatus 2000 acquires the captured image 20, any method can be used. For example, the information processing apparatus 2000 accesses a storage apparatus, in which the captured image 20 is stored, to acquire the captured image 20. The storage apparatus, in which the captured image 20 is stored, may be provided in the camera 10 or may be provided outside the camera. In addition, for example, the information processing apparatus 2000 may receive the captured image 20 transmitted from the camera 10 to acquire the captured image 20. Note that, as described above, in a case where the information processing apparatus 2000 is implemented as the camera 10, the information processing apparatus 2000 acquires the captured image 20 generated by the information processing apparatus 2000 itself.

<Detection of Parts 22: S104>

The part detection unit 2020 detects a plurality of parts 22 constituting the person from the captured image 20 (S104). The parts 22 constituting the person represent, for example, the joints of the person. The parts 22 may represent a part (eye, nose, ear, or the like) of a face, an arm, a leg, a predetermined portion (a center point or the like) of a body, or the like.

Figure 5:
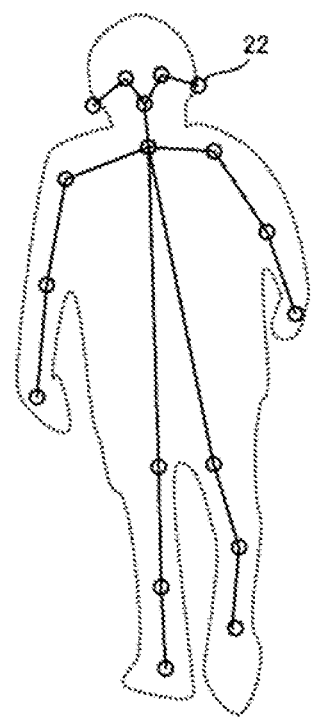
FIG. 5 is a diagram illustrating a plurality of parts and connection relationships thereof.

It is preferable that the part detection unit 2020 determines connection relationships between adjacent parts 22, in addition to the detection of the parts 22. FIG. 5 is a diagram illustrating a plurality of parts 22 and a connection relationship thereof. In FIG. 5, for example, 18 parts 22 of joint points of right and left wrists, elbows, shoulders, waists, knees, and ankles, right and left eyes and ears, a nose, and neck are detected. In addition, adjacent parts 22, such as the wrist and the elbow, the elbow and the shoulder, are connected. In a case where the connection relationship between the parts 22 is determined, even though a plurality of persons are included in the captured image 20, it is possible to divide a plurality of detected parts 22 into parts of each person.

As such a technique that detects the parts constituting the person and a technique that determines the connection relationships of the detected parts 22, for example, the technique of Non-Patent Document 1, 2, or 3 can be used. In the following description, data (in FIG. 5, data representing each straight line) connecting adjacent parts 22 is referred to as a "bone".

The part detection unit 2020 generates information representing a positional relationship of a plurality of detected parts 22. Hereinafter, information is referred to as part information. There are various kinds of information indicated by the part information. FIGS. 6 to 9 are diagrams illustrating information indicated by part information.

Figure 6:
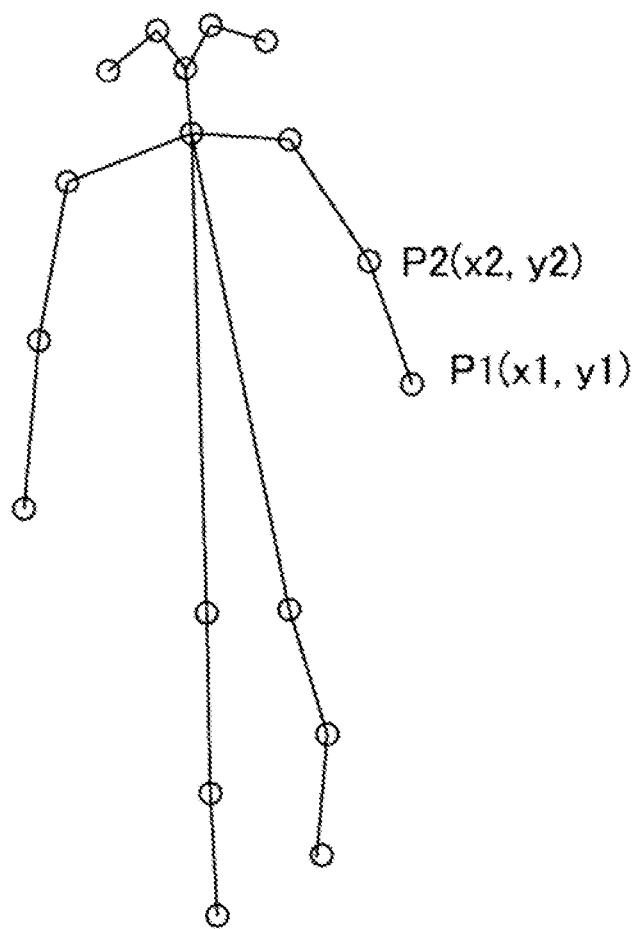
FIG. 6 is a first view illustrating information indicated by part information.

FIG. 6 is a first view illustrating information indicated by part information. In FIG. 6, the part information indicates vector data F=(P1, P2, . . . ) in which coordinates representing the position of each part 22 are listed. The coordinates of the part 22 may be absolute coordinates or may be relative coordinates. The absolute coordinates are coordinates with a predetermined position (for example, an upper left end) of the captured image 20 as the origin. On the other hand, the relative coordinates are coordinates with the coordinates of any one part 22 as the origin.

Figure 7:
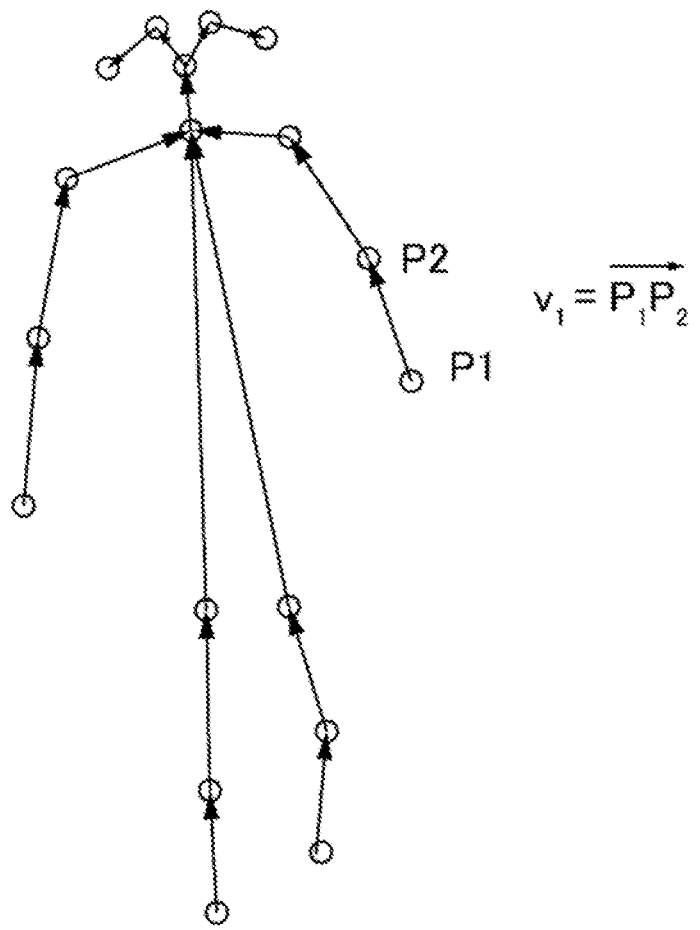
FIG. 7 is a second view illustrating information indicated by part information.

FIG. 7 is a second view illustrating information indicated by part information. In FIG. 7, the part information indicates vector data F=(v1, v2, . . . ) in which a direction vector connecting adjacent parts 22 is listed. The direction vector is also referred to as a vector representing an orientation and a magnitude of a bone. For example, in FIG. 7, a direction vector v1 is a direction vector connecting positions P1 and P2 of the part 22. Each direction vector may be normalized to length 1.

Figure 8:
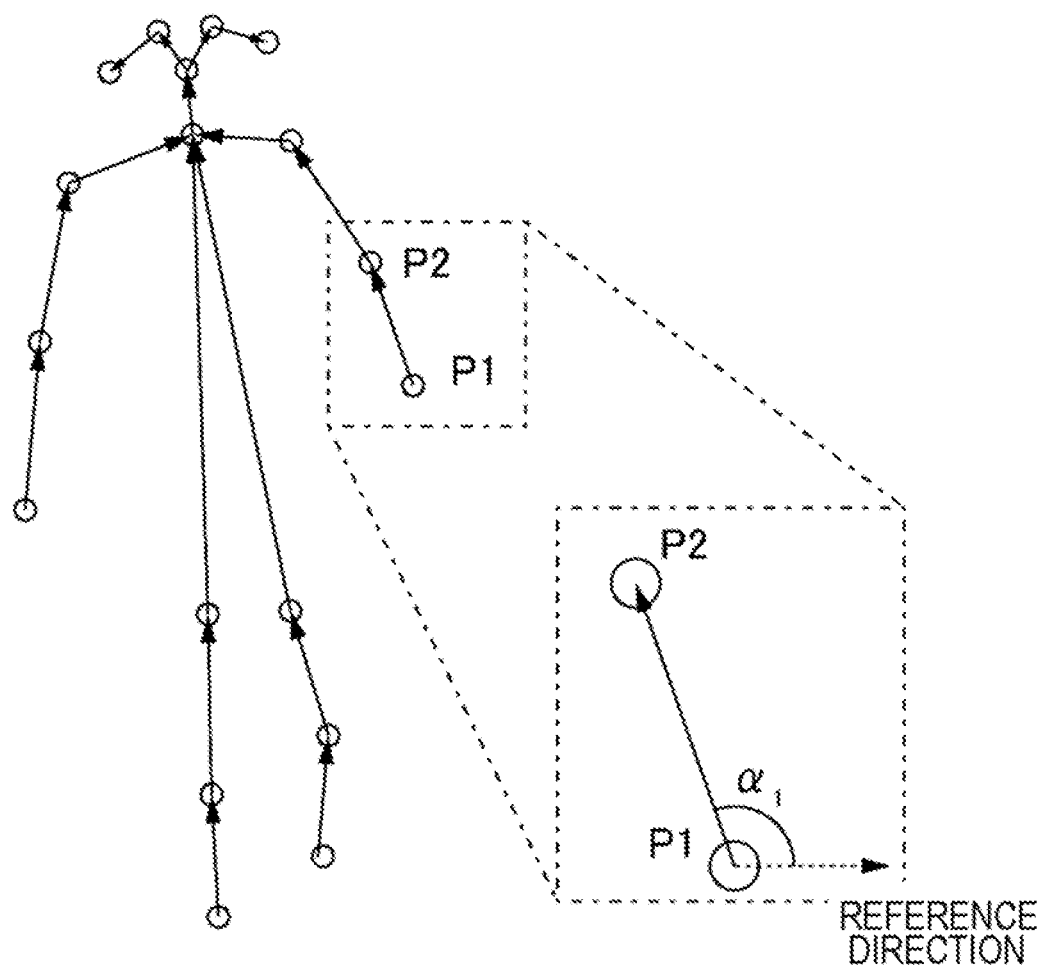
FIG. 8 is a third view illustrating information indicated by part information.

FIG. 8 is a third view illustrating information indicated by part information. In FIG. 8, the part information indicates vector data F=($\alpha$1, $\alpha$2, . . . ) in which an orientation of a direction vector connecting adjacent parts 22 is listed. The orientation of the direction vector may be represented by an angle with a predetermined direction (for example, a right direction) determined for the captured image 20 as a reference direction or may be represented by an angle with any one direction vector as a reference direction. For example, in FIG. 8, $\alpha$1 is an orientation of a direction vector v1 and is represented with the right direction of the captured image 20 as a reference direction.

Figure 9:
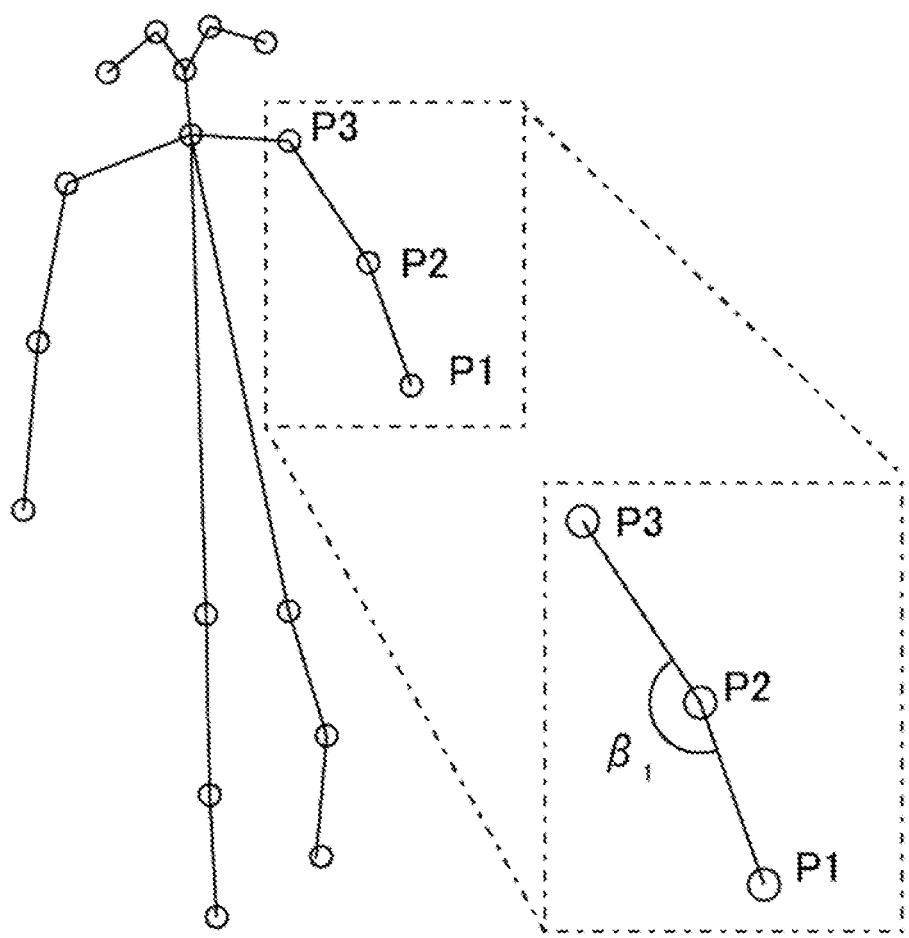
FIG. 9 is a fourth view illustrating information indicated by part information.

FIG. 9 is a fourth view illustrating information indicated by part information. In FIG. 9, the part information indicates vector data F=($\beta$1, $\beta$2, . . . ) in which the magnitude of an angle between adjacent bones is listed. For example, in FIG. 9, $\beta$1 is the magnitude of an angle between the bone connecting P1 and P2 and the bond connecting P2 and P3.

In a case where a plurality of persons are included in the captured image 20, part information is generated for each person detected from the captured image 20. This can be implemented by recognizing the connection relationships between the parts as described above.

<Detection of Estimation Position 24: S104>

The estimation position detection unit 2040 detects the estimation position 24 using the part information. As described above, the estimation position 24 is a position in the captured image 20 where the target object is estimated to be present. The estimation position 24 may be represented by one point, may be represented by a plurality of points, or may be represented by an image region on the captured image 20.

For example, in detecting the estimation position 24, reference information in which position information of a target object is associated with part information of a person who carries the target object is used. The reference information is prepared in advance and stored in a storage unit that can perform communication with the information processing apparatus 2000. The storage unit is referred to as a reference information storage unit. The reference information storage unit may be provided either outside or inside the information processing apparatus 2000.

For example, the estimation position detection unit 2040 extracts one or more pieces of reference information indicating part information having high similarity to the part information generated from the captured image 20 from the reference information storage unit. Then, the estimation position detection unit 2040 determines the estimation position 24 based on the position information of the target object indicated by the extracted reference information.

For example, the estimation position detection unit 2040 superimposes the position information of the target object indicated by the extracted reference information, thereby detecting the estimation position 24. For example, the position information of the target object indicated by the reference information is matrix data (hereinafter, referred to as a position information matrix) corresponding to each image of image data (hereinafter, referred to as a reference image) of a predetermined size including the person who carries the target object. For example, each element of the position information matrix indicates the presence or absence of the target object for each pixel of the reference image. In this case, each element of the position information matrix indicates 1 in a case where the target object is present in a corresponding pixel, and indicates 0 in a case where the target object is not present in a corresponding pixel.

There are various methods that superimpose the position information of the target object. Hereinafter, the methods are illustrated.

<<Superimposition Method 1>>

For example, the estimation position detection unit 2040 integrates the position information matrixes indicated by respective pieces of extracted reference information, thereby superimposing the position information of the target object. In matrix data obtained in this manner, an element having a large value means that the target object is present in a pixel corresponding to the element in a large number of pieces of reference information. For this reason, it can be said that matrix data obtained in this manner represents a distribution of magnitude of a probability that the target object is present.

Figure 10:
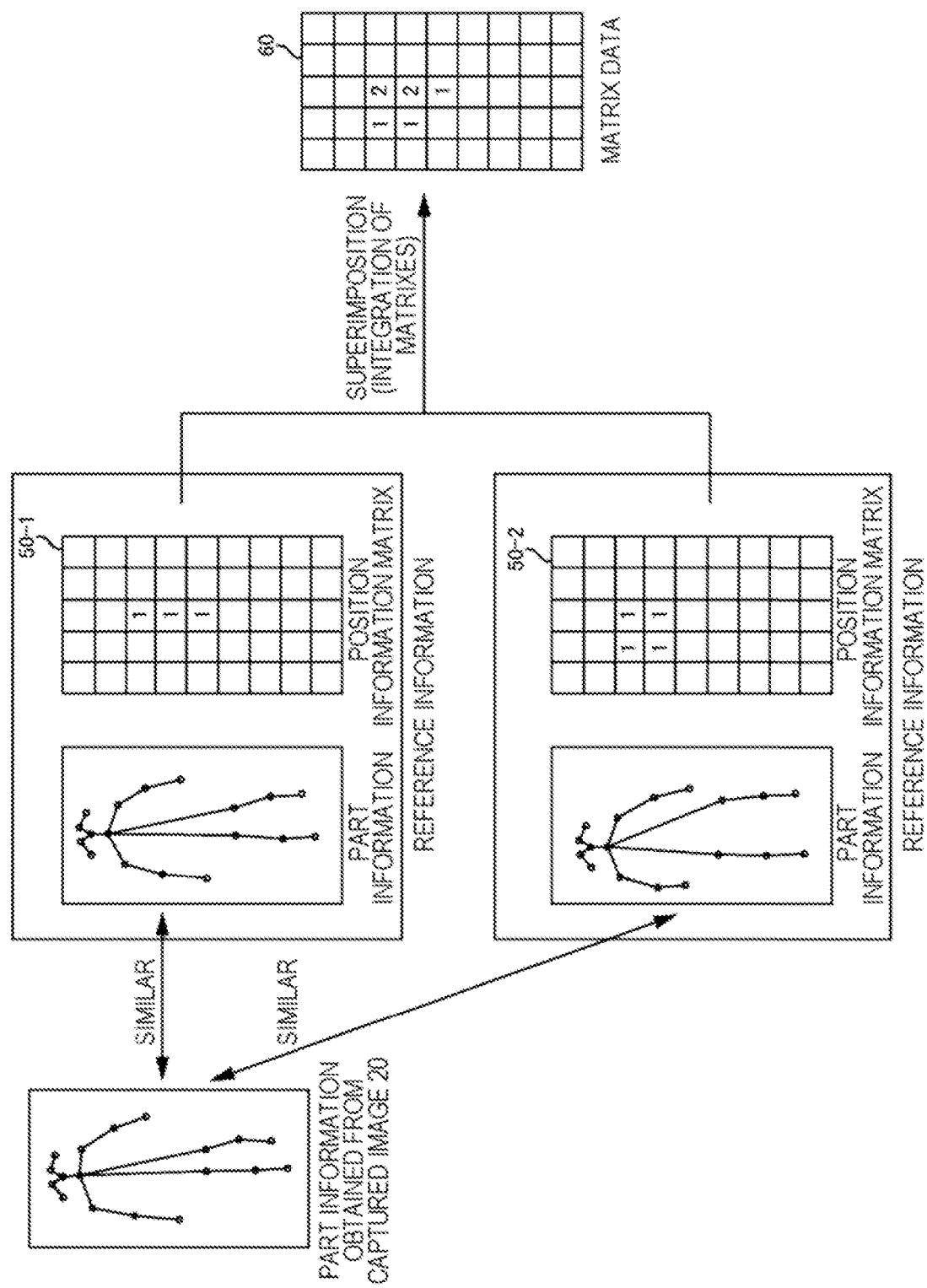
FIG. 10 is a first view illustrating a method that superimposes position information of a target object.

FIG. 10 is a first view illustrating a method that superimposes the position information matrixes. In FIG. 10, two pieces of reference information indicating part information having high similarity to the part information generated from the captured image 20 are extracted. For this reason, the estimation position detection unit 2040 integrates position information matrixes 50 indicated by the respective two pieces of reference information, thereby obtaining matrix data 60. In the position information matrixes 50 and matrix data 60, notation is omitted for a portion where the value of the element is 0 (the same applies to FIG. 11 described below).

The estimation position detection unit 2040 may further convert matrix data 60 generated in this manner. For example, the estimation position detection unit 2040 converts the values of elements other than an element having the greatest value in matrix data 60 into 0. With this, only a position where the probability that the target object is present is the highest is handled as the estimation position 24. In addition, for example, the estimation position detection unit 2040 changes the value of an element having a value equal to or less than a threshold value in matrix data 60 to 0. With this, only a position where the probability that the target object is present is large to a given degree is handled as the estimation position 24.

<<Superimposition Method 2>>

The estimation position detection unit 2040 generates matrix data of the same size as the position information matrix, 1) sets 1 to each element of matrix data in a case where the value of the corresponding element in at least one of the position information matrixes indicated by the respective pieces of extracted reference information is 1, and 2) sets 0 to each element of matrix data in a case where the value of the corresponding element is 0 in any position information matrixes indicated by the respective pieces of extracted reference information. That is, matrix data obtained as a result of superimposition indicates 1 in an element at a place where the target object is present in at least one reference image, and indicates 0 in an element at a place where the target object is not present in any reference images. Such matrix data can be obtained by computing a logical sum for each element of the position information matrixes indicated by the respective pieces of extracted reference information.

Figure 11:
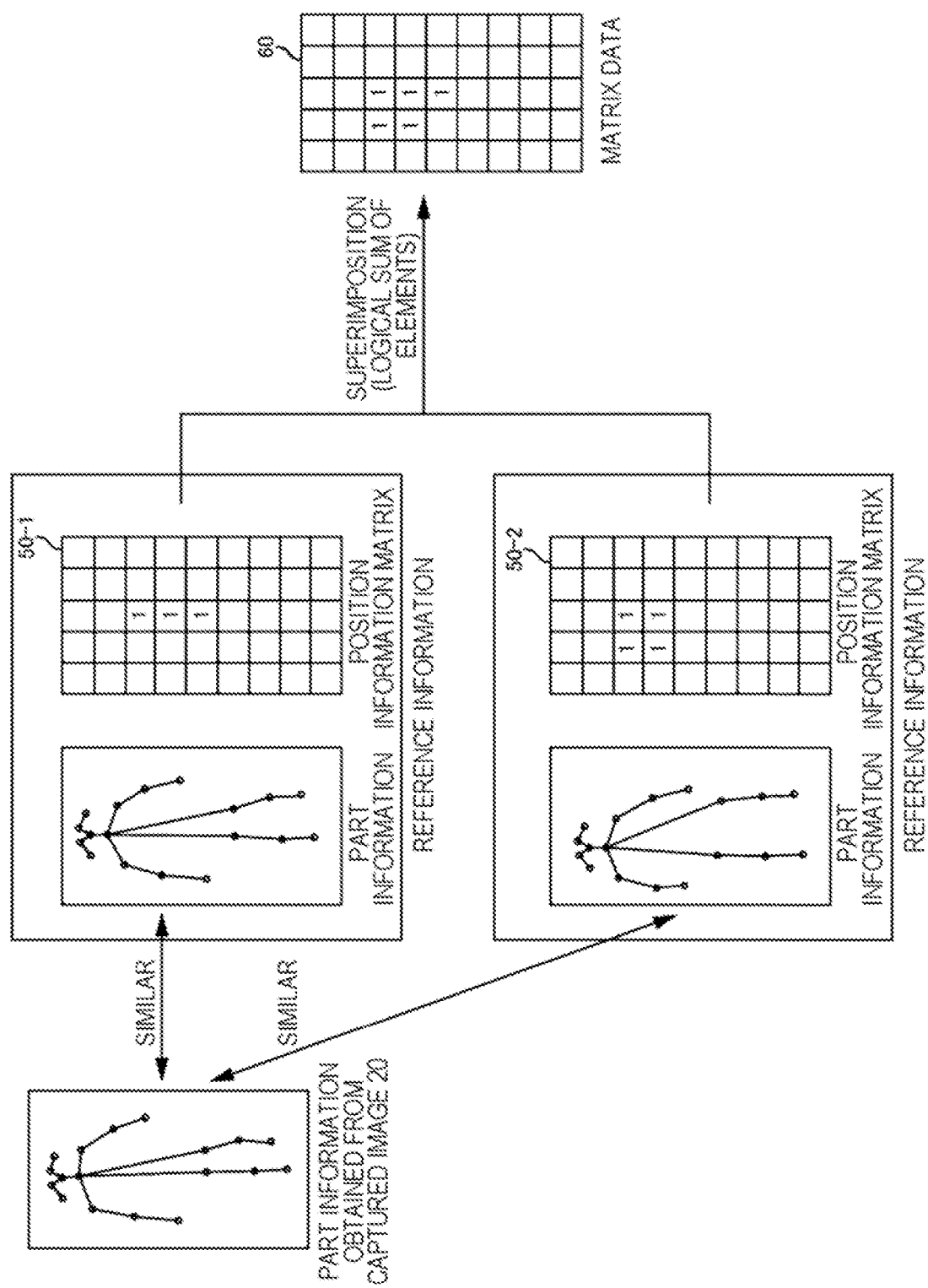
FIG. 11 is a second view illustrating the method that superimposes the position information of the target object.

FIG. 11 is a second view illustrating a method that superimposes the position information matrixes. Position information matrixes 50 extracted in FIG. 11 are the same as in the case of FIG. 10. On the other hand, matrix data 60 obtained as a result of superimposition indicates any one of 1 and 0, and is different from matrix data 60 of FIG. 10. Specifically, each element of matrix data 60 indicates 1 in a case where at least one of a value of a corresponding element of a position information matrix 50-1 and a value of a corresponding element of a position information matrix 50-2 is 1.

The estimation position detection unit 2040 may further convert matrix data 60 generated in this manner. For example, the estimation position detection unit 2040 computes a center position of a distribution of positions indicated by matrix data 60 and changes the values of elements other than an element corresponding to the computed center position to 0. With this, it is possible to handle only the center of the obtained distribution as the estimation position 24. In addition, for example, the estimation position detection unit 2040 changes the values of elements corresponding to elements outside a predetermined range centering on the above-described center position to 0. With this, the presence of the target object within the predetermined range from the center of the obtained distribution is represented. The predetermined range may be set in advance in the estimation position detection unit 2040 or may be stored in a storage apparatus that is accessible from the estimation position detection unit 2040.

<<Association of Superimposition Result with Captured Image 20>>

The estimation position detection unit 2040 associates data (that is, matrix data 60 described above) obtained as a result of superimposing the position information of the object indicated by the reference information with the captured image 20, thereby detecting the estimation position 24. For example, in a case where matrix data 60 indicates the presence or absence of the target object, the estimation position detection unit 2040 associates the elements of matrix data 60 with positions on the captured image 20 and detects the position on the captured image 20 corresponding to the element indicating the value of 1 in matrix data 60 as the estimation position 24.

In addition, for example, in a case where matrix data 60 indicates the magnitude of the probability that the target object is present (in a case where matrix data 60 is obtained by integrating the position information matrixes), the estimation position detection unit 2040 associates the elements of matrix data 60 with the positions on the captured image 20 and detects the position on the captured image 20 corresponding to the element having the value greater than 0 in matrix data 60 as the estimation position 24. In addition, the estimation position detection unit 2040 associates the value of the corresponding element of matrix data 60 with the detected estimation position 24. With this, for each estimation position 24, the magnitude of the probability that the target object is present at the estimation position 24 is obtained.

Here, the association of matrix data 60 with the captured image 20 is performed as follows. First, for the part information that is used in computing matrix data 60 and obtained from the captured image 20, the estimation position detection unit 2040 computes a bounding rectangle of a part 22 indicated by the part information. In addition, the estimation position detection unit 2040 enlarges or reduces a row size and a column size of matrix data 60 described above so as to coincide with a height and a width of the computed bounding rectangle. The estimation position detection unit 2040 maps matrix data 60 having the adjusted size to the bounding rectangle obtained from the captured image 20, thereby associating each element of matrix data 60 with the position (pixel) of the captured image.

<<Similarity Determination of Part Information>>

The estimation position detection unit 2040 extracts reference information indicating part information having high similarity to the part information obtained from the captured image 20 from the reference information storage unit. Thus, the estimation position detection unit 2040 determines whether or not two pieces of part information are similar.

The similarity of the two pieces of part information is represented by, for example, a distance between vector data indicated by the part information. For example, in a case where the distance between vector data indicated by the two pieces of part information is equal to or less than a predetermined threshold value, the estimation position detection unit 2040 determines that the pieces of part information are similar. On the other hand, in a case where the distance between the vectors is greater than the predetermined threshold value, the estimation position detection unit 2040 determines that the pieces of part information are not similar. The predetermined threshold value may be set in advance in the estimation position detection unit 2040 or may be stored in the storage apparatus that is accessible from the estimation position detection unit 2040. Here, as a technique that computes the distance between vector data, various existing techniques can be used.

In addition, for example, the estimation position detection unit 2040 may compute similarity for the part information generated from the captured image 20 and the part information included in each piece of reference information and may extract a predetermined number of pieces of reference information for which higher similarity is computed. For example, in a case where the above-described distance is used as similarity, the reference information is sorted in a descending order of the distance, whereby it is possible to sort the reference information in a descending order of similarity.

<<Method of Using Learned Detector>>

A method in which the estimation position detection unit 2040 detects the estimation position 24 is not limited to the method that extracts the reference information from the reference information storage unit. For example, the estimation position detection unit 2040 may use a detector that learned in advance so as to detect a position where the target object is estimated to be present in image data with an input of part information generated from image data. As a model of the detector, any model, such as a neural network, can be employed.

Learning of the detector is performed in advance using the reference information. Specifically, learning of the detector is performed using data composed of a combination of "image data and reference information generated from image data", that is, a combination of "image data, part information of a person included in image data, and a position of the target object carried with the person" as training data. With the use of such training data, it is possible to make the detector learn a relative positional relationship of the target object to the person.

<Output of Result>

The information processing apparatus 2000 outputs information (hereinafter, referred to as output information) regarding the determination of the estimation position 24. There are various methods of outputting the output information. For example, the information processing apparatus 2000 stores the output information in any storage apparatus. In addition, for example, the information processing apparatus 2000 displays the output information on a display apparatus.

For example, the output information indicates an identifier of the captured image 20 and the estimation position 24. In a case where a plurality of estimation positions 24 are determined from the captured image 20, the output information indicates each of a plurality of estimation positions 24. In addition, for example, the output information may be the captured image 20 on which information (for example, a mark, such as an x mark or a frame) indicating the estimation position 24 is superimposed.

Example Embodiment 2

<Outline>

Figure 12:
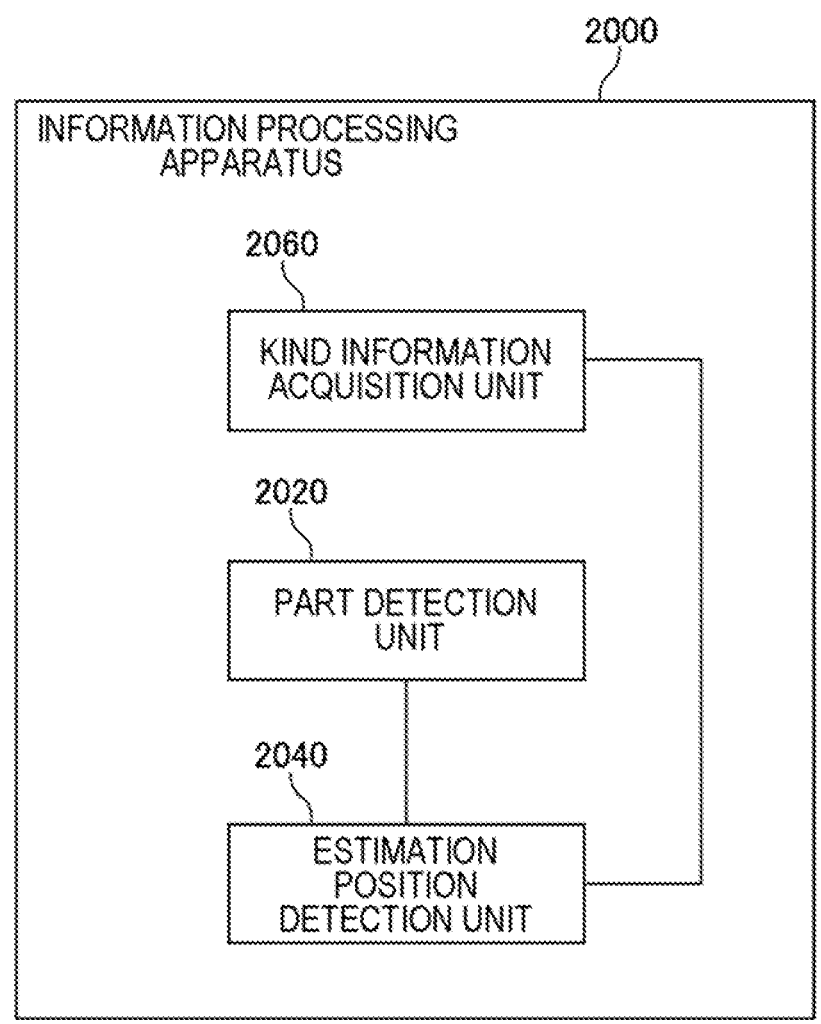
FIG. 12 is a block diagram illustrating the functional configuration of an information processing apparatus of Example Embodiment 2.

FIG. 12 is a block diagram illustrating the functional configuration of an information processing apparatus 2000 of Example Embodiment 2. The information processing apparatus 2000 of Example Embodiment 2 has the same functions as the information processing apparatus 2000 of Example Embodiment 1 except for the following points.

The information processing apparatus 2000 of Example Embodiment 2 handles a plurality of kinds of target objects. Specifically, the information processing apparatus 2000 acquires kind information indicating the kind of an object to be detected and sets the object of the kind indicated in the kind information as the target object. Thus, the information processing apparatus 2000 of Example Embodiment 2 has a kind information acquisition unit 2060 that acquires the kind information.

The number of kinds of objects indicated in the kind information may be one or may be plural. In a case where the kind information indicates a plurality of kinds of objects, the information processing apparatus 2000 sets an object of each kind as the target object and detects the estimation position 24 for each target object. For example, in a case where the kind information indicates three kinds of "hat, sunglasses, and white cane", the information processing apparatus 2000 detects the estimation position 24 of a hat, the estimation position 24 of sunglasses, and the estimation position 24 of a white cane from the captured image 20.

The kind information may indicate that any kind of object, not a specific kind of object, is to be detected. In this case, the information processing apparatus 2000 sets all kinds of objects capable of being handled by the information processing apparatus 2000 as the target object and detects the estimation position 24 for each target object.

There are various methods in which the kind information acquisition unit 2060 acquires the kind information. For example, the kind information acquisition unit 2060 acquires the kind information from a storage apparatus in which the kind information is stored. In addition, for example, the kind information acquisition unit 2060 receives kind information transmitted from another apparatus to acquire the kind information. Moreover, for example, the kind information acquisition unit 2060 receives an input of kind information from a user to acquire the kind information.

The estimation position detection unit 2040 of Example Embodiment 2 detects the estimation position 24 for the object of the kind indicated in the kind information. For example, it is assumed that the reference information, which is used by the information processing apparatus 2000 of Example Embodiment 2, is prepared for each kind of object. That is, the reference information indicates a combination of "a kind of an object, a position of the object of the kind, and part information of a person who carries the object of the kind". The estimation position detection unit 2040 extracts the reference information that indicates the object of the kind indicated in the kind information and indicates part information having high similarity to the part information generated from the captured image 20. Then, the estimation position detection unit 2040 detects the estimation position 24 using the extracted reference information.

In addition, for example, the estimation position detection unit 2040 of Example Embodiment 2 may prepare the detector, which detects the estimation position 24, for each kind of object. In this case, for each kind of object, learning of the detector that detects the estimation position 24 of the object of the kind is performed using the reference information relating to the object of the kind. The estimation position detection unit 2040 inputs the part information generated from the captured image 20 to the detector corresponding to the object of the kind indicated by the kind information, thereby detecting the estimation position 24 for the object of the kind.

Advantageous Effects

With the information processing apparatus 2000 of the example embodiment, the estimation position 24 is detected for the object of the kind indicated by the kind information. With this, the information processing apparatus 2000 can be set so as to detect the specified object among a plurality of kinds of objects from the captured image 20. For this reason, each of a plurality of kinds of objects can be detected from the captured image 20 or the kind of an object to be detected can be changed at each occasion. For this reason, the convenience of the information processing apparatus 2000 is improved.

For example, in response to information relating to a belonging of a suspicious person being obtained, the information processing apparatus 2000 can be set so as to detect the belonging of the suspicious person. In a case where a left-behind object is found, the information processing apparatus 2000 can be set so as to detect the left-behind object.

<Example of Hardware Configuration>

The hardware configuration of a computer that implements the information processing apparatus 2000 of Example Embodiment 2 is represented by, for example, FIG. 3 as in Example Embodiment 1. However, a program module that implements the functions of the information processing apparatus 2000 of the present example embodiment is stored in a storage device 1080 of a computer 1000 that implements the information processing apparatus 2000 of the present example embodiment.

<Flow of Processing>

Figure 13:
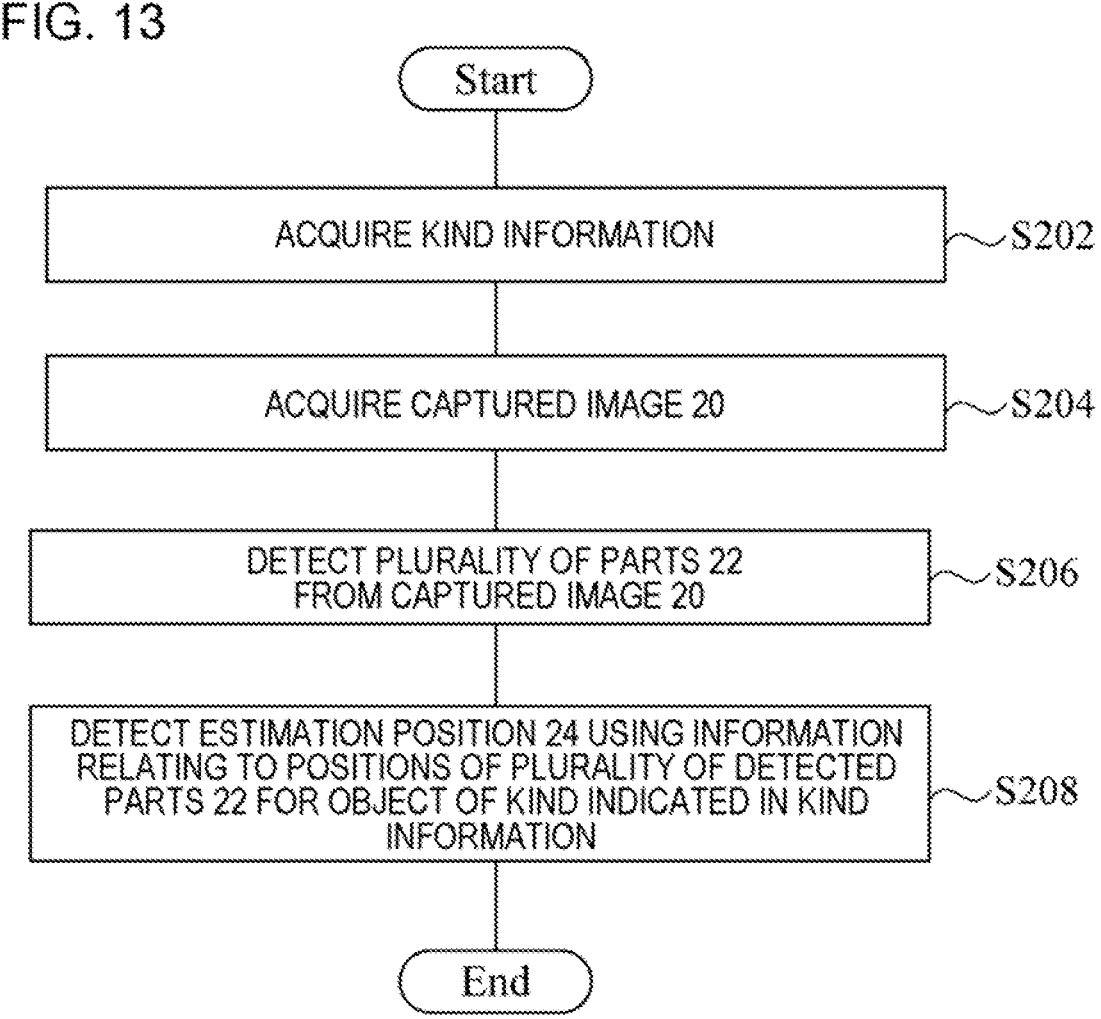
FIG. 13 is a flowchart illustrating a flow of processing that is executed by the information processing apparatus of Example Embodiment 2.

FIG. 13 is a flowchart illustrating a flow of processing that is executed by the information processing apparatus 2000 of Example Embodiment 2. The kind information acquisition unit 2060 acquires the kind information (S202). The information processing apparatus 2000 acquires the captured image 20 (S204). The part detection unit 2020 detects the parts 22 (S206). The estimation position detection unit 2040 detects the estimation position 24 for the object of the kind indicated in the kind information (S208).

Example Embodiment 3

Figure 14:
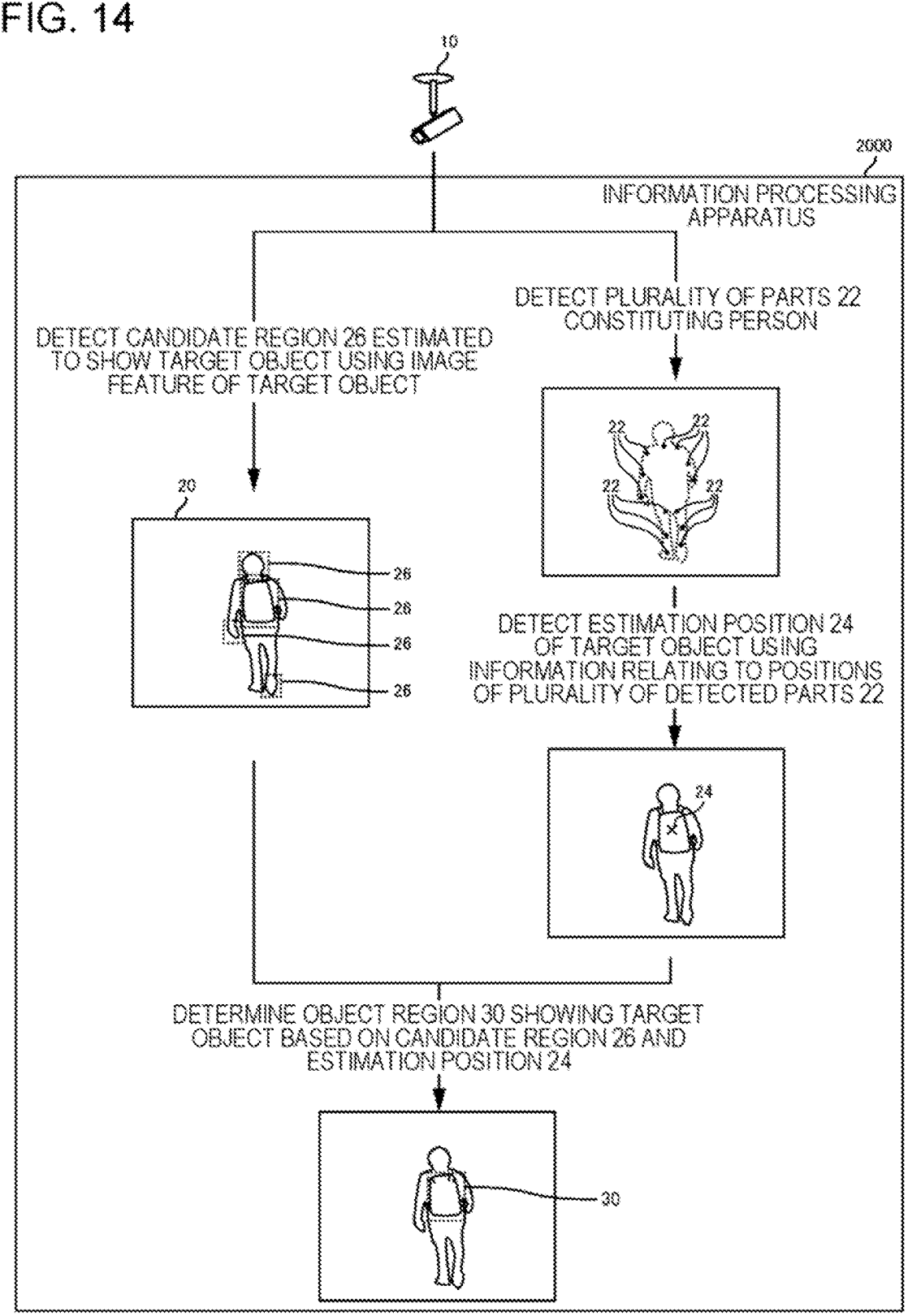
FIG. 14 is a diagram illustrating the outline of processing that is executed by an information processing apparatus of Example Embodiment 3.

FIG. 14 is a diagram illustrating the outline of processing that is executed by an information processing apparatus 2000 of Example Embodiment 3. The information processing apparatus 2000 of Example Embodiment 3 detects one or more candidate regions 26 from the captured image 20 based on an image feature of the target object. The candidate region 26 is a candidate of an image region that is estimated to represent the target object. For example, in a case where the target object is a hat, the information processing apparatus 2000 detects an image region estimated to represent the hat based on an image feature of the hat and sets the detected image region as the candidate region 26. The candidate region 26 is, for example, an image region presumed that a probability of representing the target object is equal to or greater than a predetermined value.

In addition, the information processing apparatus 2000 determines the object region 30 based on the candidate region 26 and the estimation position 24. For example, the information processing apparatus 2000 determines the candidate region 26 including the estimation position 24 among a plurality of detected candidate regions 26 as the object region 30. However, as described below, the object region 30 that is determined based on the candidate region 26 and the estimation position 24 is not limited to the candidate region 26 including the estimation position 24.

<Operations and Effects>

With the information processing apparatus 2000 of the present example embodiment, the object region 30 representing the target object is determined using the candidate region 26 detected based on the image feature of the target object and the estimation position 24 detected based on a plurality of parts 22 constituting the person. With this, not all of the candidate regions 26 detected based on the image feature of the target object are determined as the object region 30 (the image region representing the target object), but the candidate region 26 that is determined as the object region 30 is limited by the estimation position 24. For example, the candidate region 26 at a position where the target object is less likely to be present is not determined as the object region 30. In this way, the image region representing the target object is determined using two criteria of a criterion of the image feature of the target object and a criterion of the positions of a plurality of parts constituting the person, whereby it is possible to determine the image region representing the target object with high accuracy compared to a case where an image region is determined by one criterion of the image feature of the target object.

Note that the above description referring to FIG. 14 is for illustration for ease of understanding of the information processing apparatus 2000, and is not intended to limit the functions of the information processing apparatus 2000. Hereinafter, the information processing apparatus 2000 of the present example embodiment will be described in more detail.

<Example of Functional Configuration>

Figure 15:
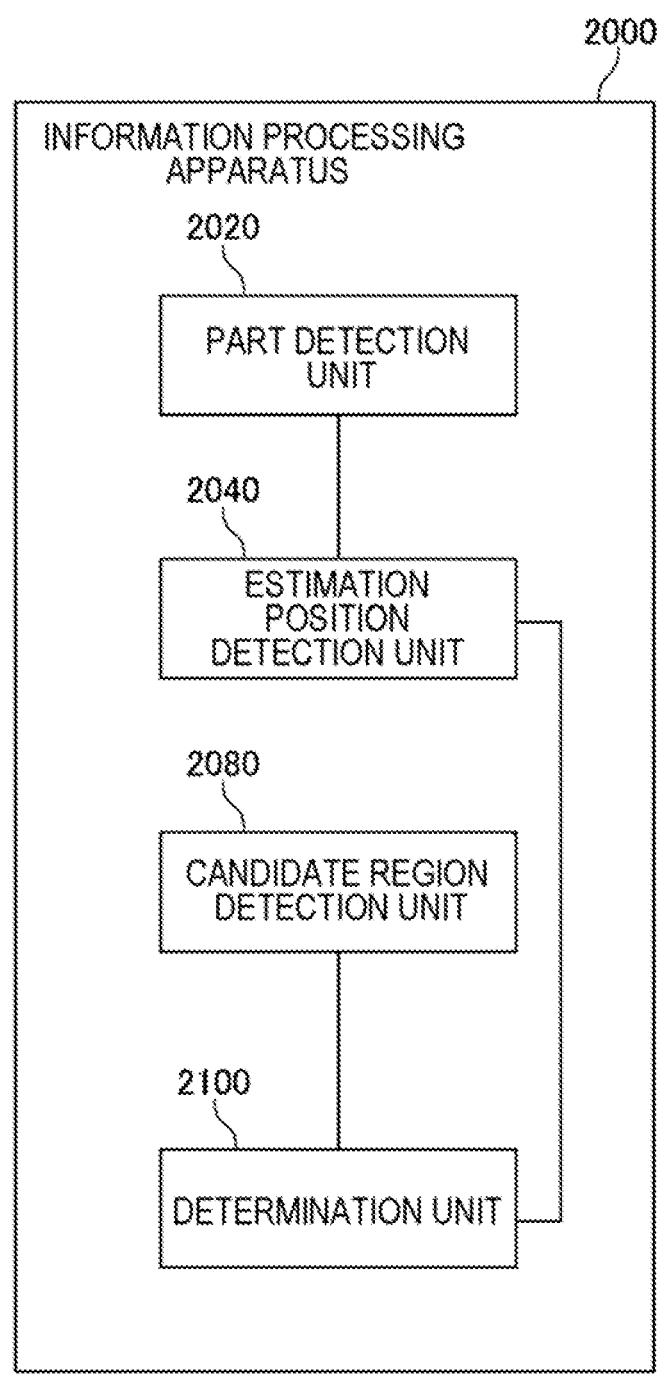
FIG. 15 is a block diagram illustrating the functional configuration of the information processing apparatus of Example Embodiment 3.

FIG. 15 is a block diagram illustrating the functional configuration of an information processing apparatus 2000 of Example Embodiment 3. The information processing apparatus 2000 of Example Embodiment 3 has a candidate region detection unit 2080 and a determination unit 2100, in addition to the functional components (see FIG. 2) of the information processing apparatus 2000 of Example Embodiment 2. The candidate region detection unit 2080 detects one or more candidate regions 26 from the captured image 20 based on the image feature of the target object. The determination unit 2100 determines the object region 30 from among the candidate regions 26 based on one or more detected candidate regions 26 and the estimation position 24.

<Example of Hardware Configuration>

The hardware configuration of a computer that implements the information processing apparatus 2000 of Example Embodiment 2 is represented by, for example, FIG. 3 as in Example Embodiment 1. However, a program module that implements the functions of the information processing apparatus 2000 of the present example embodiment is stored in a storage device 1080 of a computer 1000 that implements the information processing apparatus 2000 of the present example embodiment.

<Flow of Processing>

Figure 16:
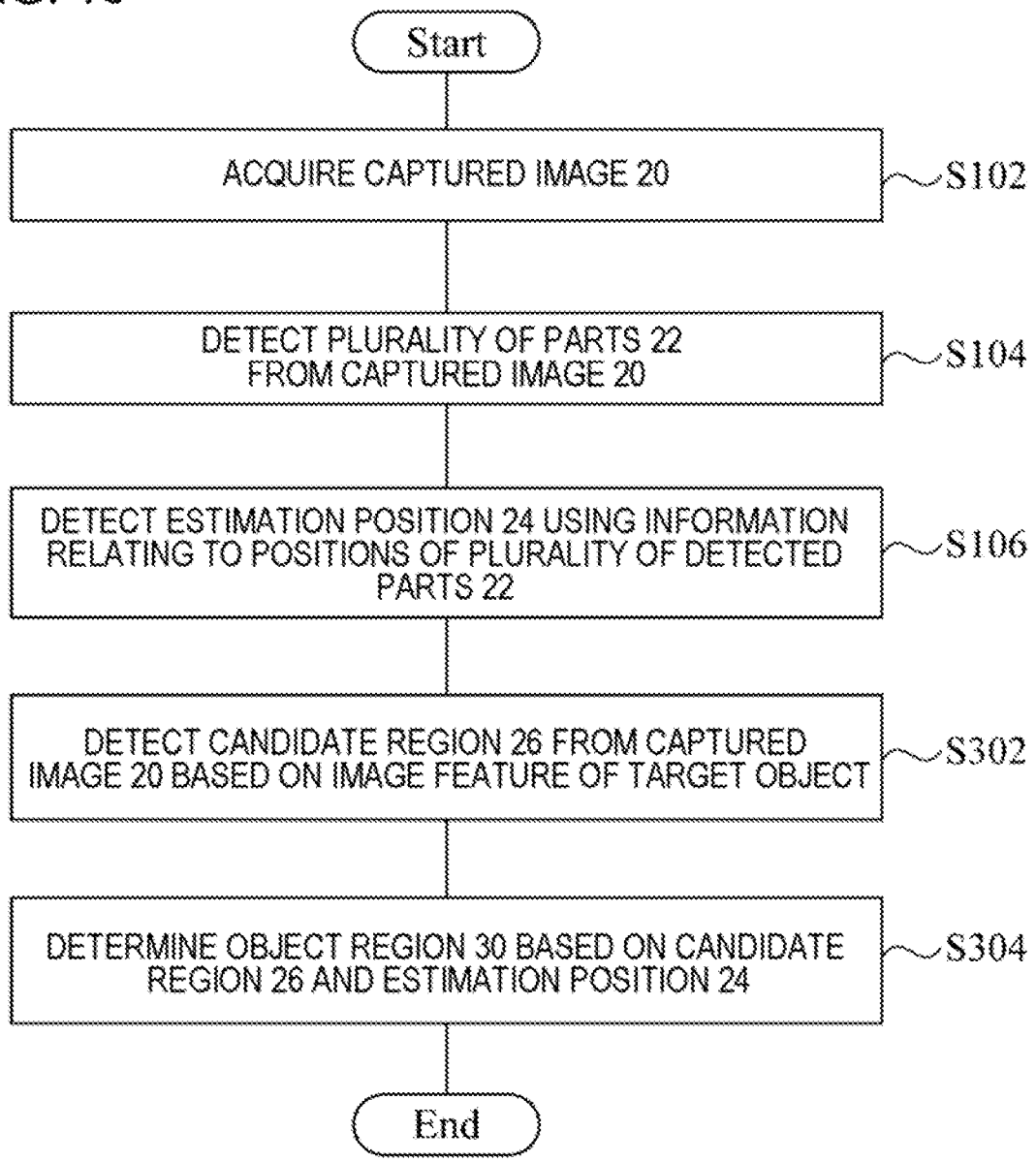
FIG. 16 is a flowchart illustrating a flow of processing that is executed by the information processing apparatus of Example Embodiment 2.

FIG. 16 is a flowchart illustrating a flow of processing that is executed by the information processing apparatus 2000 of Example Embodiment 2. Steps represented by the same reference numerals as in FIG. 4 are the same as the steps shown in FIG. 4. The candidate region detection unit 2080 detects one or more candidate regions 26 from the captured image 20 based on the image feature of the target object (S302). The determination unit 2100 determines the object region 30 based on the candidate regions 26 and the estimation position 24 (S304).

Note that all kinds of processing do not always need to be executed sequentially as shown in FIG. 16. For example, the processing (S302) that is executed by the candidate region detection unit 2080 and the processing (S104 and S106) that is executed by the estimation position detection unit 2040 may be executed in parallel.

<Detection of Candidate Region 26: S302>

The candidate region detection unit 2080 detects the candidate regions 26 from the captured image 20 based on the image feature of the target object (S302). Here, as a technique that detects, based on an image feature of an object to be detected, an image region (that is, the candidate regions 26) presumed to represent the object from image data, an existing technique can be used. For example, in detecting the candidate regions 26, a detector that learned in advance so as to detect the image region estimated to represent the target object from image data can be used. As a model of the detector, any model, such as a neural network (for example, a convolutional neural network) or a support vector machine (SVM), can be employed.

Here, the candidate region detection unit 2080 detects an image region, for which a probability of being presumed to represent the target object is equal to or greater than a threshold value, as the candidate region 26. Here, in a case where the threshold value is made large, false negative (detection failure) easily occurs. On the other hand, in a case where the threshold value is made small, false positive (erroneous detection) easily occurs.

In this respect, in the information processing apparatus 2000, the object region 30 is not determined only by the candidate region detection unit 2080, but the object region 30 is determined also using the estimation position 24 detected by the estimation position detection unit 2040. For this reason, it can be said that it is preferable that the threshold value is set to be small and erroneous detection occurs compared to that the threshold value is set to be large and detection failure occurs. This is because the object region 30 representing the target object can be determined with high accuracy by a method of setting the threshold value to be small to detect many candidate regions 26 and narrowing down the candidate regions 26 using the estimation position 24 detected by the estimation position detection unit 2040.

Now, the threshold value that is used by the candidate region detection unit 2080 is suitably set to a value equal to or less than a threshold value set in a case where the object region is determined based on only the image feature of the target object (that is, in a case where the estimation position detection unit 2040 is not used).

The candidate region detection unit 2080 generates data representing a detection result of the candidate region 26. Such data is data that determines the detected candidate region 26, and indicates, for example, a specific position (for example, coordinates of an upper left end) and a size (for example, a width and a height) of the candidate region 26.

<Determination of Object Region 30: S304>

The determination unit 2100 determines the object region 30 based on the candidate regions 26 and the estimation position 24 (S304). Conceptually, the determination unit 2100 determines the candidate region 26, which is particularly highly likely to include the target object, from among the candidate regions 26, each of which is the image region presumed to include the target object, using the estimation position 24 and determines the determined candidate region 26 as the object region 30. However, as described below, the object region 30 does not need to completely coincide with any one candidate region 26, and may be a partial image region of the candidate region 26.

The determination unit 2100 determines the object region 30 in view of an overlap of the candidate region 26 and the estimation position 24. As a specific method of the determination, various methods can be employed. Hereinafter, the specific method will be illustrated.

<<Specific Method 1>>

Figure 17:
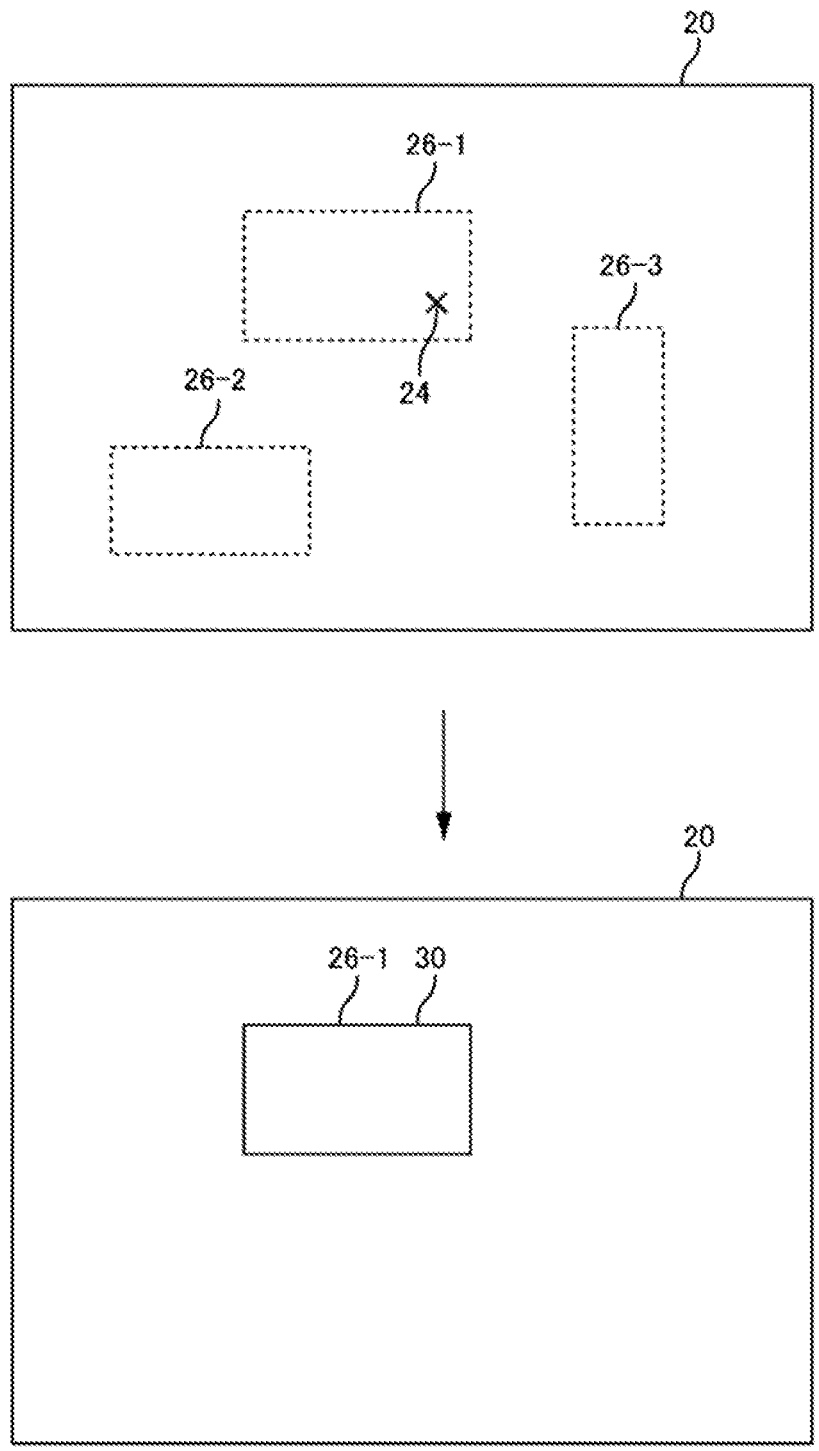
FIG. 17 is a diagram illustrating a candidate region including an estimation position.

The determination unit 2100 determines the candidate region 26 including the estimation position 24 as the object region 30. FIG. 17 is a diagram illustrating the candidate region 26 including the estimation position 24. In FIG. 17, a plurality of candidate regions 26 are detected from the captured image 20. Furthermore, one estimation position 24 is detected. Here, the estimation position 24 is included in a candidate region 26-1. Now, the determination unit 2100 determines the candidate region 26-1 as the object region 30.

<<Specific Method 2>>

Here, it is assumed that a plurality of estimation positions 24 are computed. Then, for each candidate region 26, the determination unit 2100 computes a score (hereinafter, referred to as a first score) representing a degree to which the candidate region 26 includes the estimation position 24. The determination unit 2100 determines the object region 30 based on the first score.

There are various methods of determining the object region 30 based on the first score. For example, the determination unit 2100 determines the candidate region 26, for which the first score is the greatest, as the object region 30. In addition, for example, the determination unit 2100 determines the candidate region 26, for which the first score is equal to or greater than a predetermined value, as the object region 30. In the latter case, a plurality of object regions 30 can be determined.

There are various ways of defining the first score. For example, the determination unit 2100 computes the number of estimation positions 24 included in the candidate region 26 as the first score for the candidate region 26. In addition, for example, the determination unit 2100 computes a value obtained by normalizing the number of estimation position 24 included in the candidate region 26 by the size of the candidate region 26 (for example, a value obtained by dividing the number of estimation positions 24 by the area of the candidate region 26) as the first score for the candidate region 26.

Figure 18:
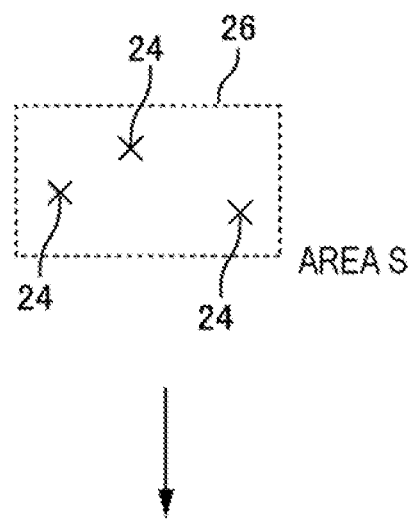
FIG. 18 is a diagram illustrating a first score that is computed based on the number of estimation positions included in a candidate region.

FIG. 18 is a diagram illustrating a first score that is computed based on the number of estimation positions 24 included in the candidate region 26. Three estimation positions 24 are included in the candidate region 26. Now, for example, the determination unit 2100 sets the first score of the candidate region 26 to three. Here, it is assumed that the area of the candidate region 26 is S. In this case, the determination unit 2100 may set 3/S obtained by normalizing the first score of the candidate region 26 by the area of the candidate region 26 as the first score.

A computation method of the first score is not limited to the above-described example. For example, it is assumed that a probability of the presence of the target object is computed for each estimation position 24. In this case, the determination unit 2100 may compute the total of the presence probabilities computed for the respective estimation positions 24 included in the candidate region 26 as the first score for the candidate region 26.

Figure 19:
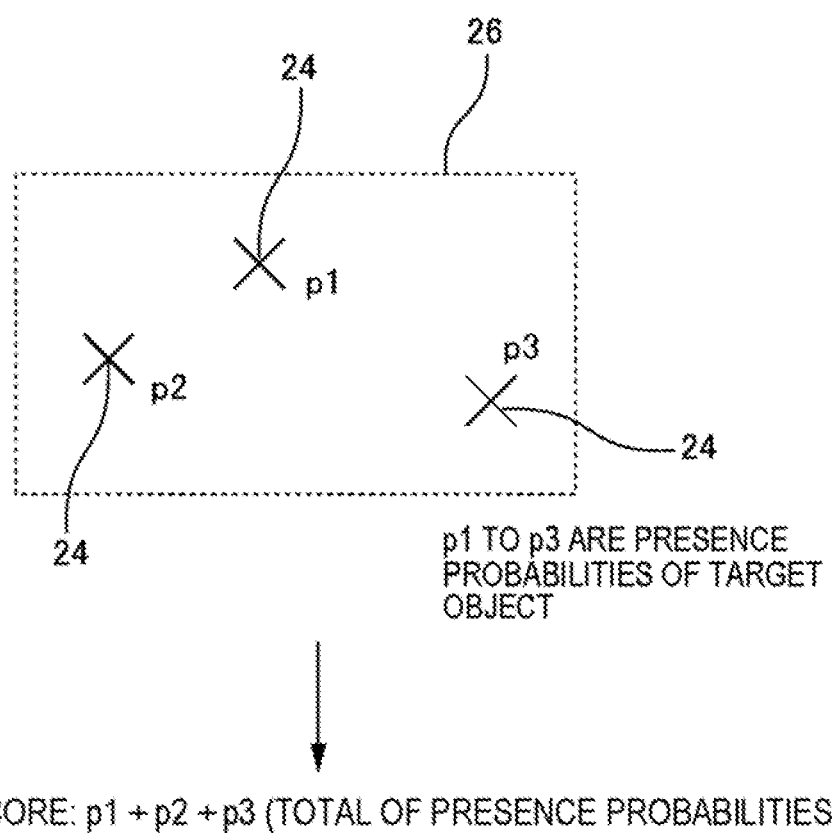
FIG. 19 is a diagram illustrating a first score that is computed in consideration of a presence probability of a target object computed for an estimation position.

FIG. 19 is a diagram illustrating a first score that is computed in consideration of a presence probability of the target object computed for the estimation position 24. Three estimation positions 24 are included in the candidate region 26, and the presence probabilities computed for the respective estimation positions 24 are p1, p2, and p3. For this reason, the first score of the candidate region 26 is p1+p2+p3.

In this way, the first score is computed in consideration of the probability that the target object is present at the estimation position 24, whereby the object region 30 representing the target object can be determined with higher accuracy. For example, it can be said that the candidate region 26 including one estimation position 24 where the presence probability of the target object is 0.6 is highly likely to be the image region representing the target object rather than the candidate region 26 including three estimation positions 24 where the presence probability of the target object is 0.1. With the computation method in which the total of the presence probabilities is set as the first score, the first score of the former candidate region 26 becomes greater than the first score of the latter candidate region 26. For this reason, the former candidate region 26 is easily determined as the object region 30.

<<Specific Method 3>>

Here, it is assumed that, for each candidate region 26, the candidate region detection unit 2080 computes a probability that the candidate region 26 represents the target object. Furthermore, it is assumed that the determination unit 2100 computes the above-described first score for each candidate region 26. The determination unit 2100 computes a second score as a product of the probability that the candidate region 26 represents the target object and the first score. Then, the determination unit 2100 determines the object region 30 based on the second score.

There are various methods of determining the object region 30 based on the second score. For example, the determination unit 2100 determines the candidate region 26, for which the second score is the greatest, as the object region 30. In addition, for example, the determination unit 2100 determines the candidate region 26, for which the second score is equal to or greater than a predetermined value, as the object region 30.

<<Specific Method 4>>

The determination unit 2100 computes a third score based on a distance between a representative point of the candidate region 26 and the estimation position 24 and determines the object region 30 based on the computed third score. There are various methods of determining the object region 30 based on the third score. For example, the determination unit 2100 determines the candidate region 26, for which the smallest third score is computed, as the object region 30. In addition, for example, the determination unit 2100 determines the candidate region 26, for which the third score equal to or less than a predetermined value is computed, as the object region 30.

The representative point of the candidate region 26 can be any point included in the candidate region 26. For example, the representative point of the candidate region 26 is the center of the candidate region 26.

In a case where there are a plurality of estimation positions 24, the determination unit 2100 may compute a distance between each of a plurality of estimation positions 24 and the representative point of the candidate region 26 or may compute a distance between any one estimation position 24 and the representative point of the candidate region 26. In the former case, for example, the determination unit 2100 computes the third score based on a statistic (a minimum value, a mode, an average value, or the like) of a plurality of computed distances. In the latter case, the determination unit 2100 computes a distance between one estimation position 24 and the representative point of the candidate region 26 and computes the third score based on the distance.

Here, in a case of computing a distance between only one estimation position 24 and the representative point of the candidate region 26, there are various methods of determining the estimation position 24. For example, the determination unit 2100 computes the center of an image region composed of a plurality of estimation positions 24, determines the estimation position 24 closest to the center, and computes a distance between the determined estimation position 24 and the representative point of the candidate region 26. In addition, for example, in a case where the presence probability of the target object is computed for each estimation position 24, the determination unit 2100 computes a distance between the estimation position 24, for which the presence probability of the target object is the highest, and the representative point of the candidate region 26.

In a case where the estimation position 24 is represented as an image region, the determination unit 2100 computes the third score based on a distance between a representative point of the image region and the representative point of the candidate region 26. The representative point of the estimation position 24 represented as the image region is, for example, the center position of the image region.

There are various methods of computing the third score based on the distance between the estimation position 24 and the representative point of the candidate region 26. For example, the determination unit 2100 sets the distance between the representative point of the candidate region 26 and the estimation position 24 itself as the third score.

In addition, for example, the determination unit 2100 sets a value obtained by multiplying the distance between the representative point of the candidate region 26 and the estimation position 24 by a correction coefficient based on a probability of the presence of the target object at the estimation position 24 as the third score. The correction coefficient becomes smaller as the probability of the presence of the target object at the estimation position 24 is higher. For example, the correction coefficient is a reciprocal of the probability of the target object at the estimation position 24.

In this way, the probability of the presence of the target object at the estimation position 24 is taken into consideration, whereby the object region 30 representing the target object can be determined with higher accuracy. For example, it is considered that the candidate region 26 having the distance of 2 from the estimation position 24, for which the probability of the presence of the target object is 0.6, is highly likely to be the image region representing the target object rather than the candidate region 26 having the distance of 1 from the estimation position 24, for which the probability of the presence of the target object is 0.1. With the method using the correction coefficient described above, the former candidate region 26 has the third score greater than the latter candidate region 26. Accordingly, the former candidate region 26 is easily determined as the object region 30.

<Output of Result>

The information processing apparatus 2000 outputs information (hereinafter, referred to as output information) regarding the determination of the object region 30. There are various methods of outputting the output information. For example, the information processing apparatus 2000 stores the output information in any storage apparatus. In addition, for example, the information processing apparatus 2000 stores the output information in a display apparatus.

For example, the output information indicates an identifier of the captured image 20, a position (for example, coordinates of an upper left end of the object region 30) where the object region 30 is determined and the size (for example, a width and a height) of the object region 30. In a case where the object regions 30 are determined from the captured image 20, the output information indicates the position and the size for each of a plurality of the object regions 30. In addition, for example, the output information may be the captured image 20 on which information (for example, a frame) indicating the object region 30 is superimposed.

<Limitation of Detection Range of Parts 22>

The estimation position detection unit 2040 may limit a range of performing the detection of the parts 22 using the candidate region 26. That is, the detection of the parts 22 is performed from a partial image region limited based on the candidate region 26 instead of the entire captured image 20. Specifically, the estimation position detection unit 2040 detects the parts 22 from a predetermined range (for example, a range obtained by enlarging the candidate region 26 with a predetermined magnification) including the candidate region 26. With this, it is possible to reduce a time or computer resources needed for detecting the parts 22.

<Use of Kind Information>

The information processing apparatus 2000 of Example Embodiment 3 may acquire kind information as in the information processing apparatus 2000 of Example Embodiment 2. In this case, the information processing apparatus 2000 of Example Embodiment 3 performs the detection of the candidate region 26, the detection of the estimation position 24, and the determination of the object region 30 for the object of the kind indicated in the kind information.

In this case, the candidate region detection unit 2080 detects the candidate region 26 for the object of the kind indicated in the kind information. Here, as a technique that detects an object of the specific kind from image data, an existing technique can be used. For example, a detector that learned so as to detect, for each kind of object, an object of the kind from image data is prepared. The candidate region detection unit 2080 inputs the captured image 20 to the detector, which learned so as to detect the candidate region 26 for the object of the kind indicated by the kind information, to detect the candidate region 26 for the object of the kind.

The determination unit 2100 determines the object region 30 based on the candidate region 26 and the estimation position 24 detected for the target object of the kind indicated by the kind information as described above. The output information is generated for each kind of object.

Figure 20:
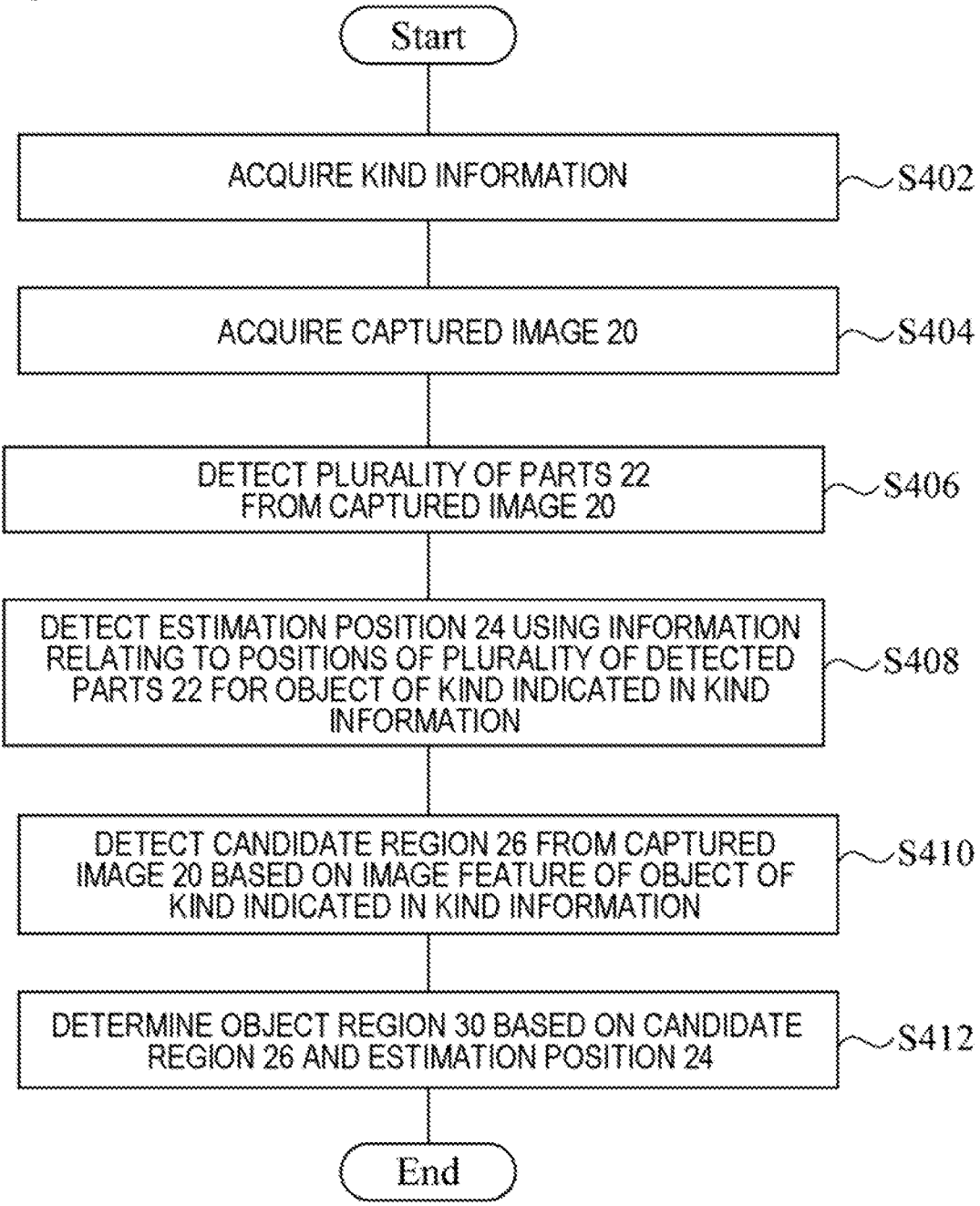
FIG. 20 is a flowchart illustrating a flow of processing that is executed by the information processing apparatus of Example Embodiment 3 using kind information.

FIG. 20 is a flowchart illustrating a flow of processing that is executed by the information processing apparatus 2000 of Example Embodiment 3 using the kind information. The kind information acquisition unit 2060 acquires the kind information (S402). The information processing apparatus 2000 acquires the captured image 20 (S404). The estimation position detection unit 2040 detects the parts 22 from the captured image 20 (S406). The estimation position detection unit 2040 detects the estimation position 24 based on a plurality of detected parts 22 (S408). For the object of the kind indicated in the kind information, the candidate region detection unit 2080 detects the candidate region 26 from the captured image 20 based on the image feature of the object of the kind (S410). The determination unit 2100 determines the object region 30 based on the detected candidate region 26 and estimation position 24 (S412).

Although the example embodiments of the present invention have been described above referring to the drawings, the example embodiments are merely examples of the present invention. The present invention can employ various configurations other than the above.

A part or the whole of the above-described example embodiments can be described as, but is not limited to, the following supplementary notes.

1. An information processing apparatus including:
a part detection unit that detects a plurality of parts constituting a body of a person included in a captured image; and
an estimation position detection unit that detects an estimation position of a target object in the captured image using information relating to a position of each of the plurality of detected parts.

2. The information processing apparatus described in 1,
in which the information processing apparatus is connected to a reference information storage unit that stores reference information in a communicable manner,
in which the reference information associates position information of an object with part information relating to a position of each of a plurality of parts of a person who carries the object,
the part detection unit generates part information relating to the position of each of the plurality of parts,
the estimation position detection unit extracts the reference information that indicates the part information having high similarity to the generated part information, and decides the estimation position of the target object based on the position information of the object indicated in the extracted reference information.

3. The information processing apparatus described in 2,
in which the part information is vector data in which any one of coordinates of each of a plurality of parts, a direction vector connecting each of a plurality of parts and an adjacent part, an orientation of the direction vector, and an angle between straight lines connecting adjacent parts is listed, and
the estimation position detection unit
computes a distance between vector data indicated by the generated part information and vector data indicated by the part information included in the reference information, and
extracts, as the reference information indicating the part information having high similarity to the generated part information, the reference information in which the distance computed for the corresponding part information is equal to or less than a threshold value or the reference information in which magnitude of the distance computed for the corresponding part information is equal to or lower than a predetermined rank in an ascending order.

4. The information processing apparatus described in 2 or 3, in which the position information of the object indicated by the reference information is matrix data representing presence or absence of the target object in each pixel of an image including the person who carries the target object, and the estimation position detection unit detects the estimation position by superimposing the matrix data indicated by the respective extracted reference information.

5. The information processing apparatus described in any one of 2 to 4, further including:

a kind information acquisition unit that acquires kind information indicating a kind of the target object, in which the reference information associates a kind of an object, part information of a person who carries the object of the kind and position information of the object of the kind with one another, and the estimation position detection unit extracts the reference information that indicates the kind of the target object indicated by the kind information and indicates the part information having similarity to the part information generated by the part detection unit equal to or greater than a threshold value, and decides the estimation position of the target object based on the position information of the target object indicated in the extracted reference information.

6. The information processing apparatus described in any one of 2 to 5, in which at least one part is a joint.

7. The information processing apparatus described in any one of 1 to 6, further including:

a candidate region detection unit that detects one or more candidate regions, each of which is an image region estimated to represent the target object, from the captured image based on an image feature of the target object; and a determination unit that determines an object region, which is an image region representing the target object, from among the one or more detected candidate regions based on the one or more detected candidate regions and the estimation position.

8. A control method that is executed by a computer, the control method including:

a part detection step of detecting a plurality of parts constituting a body of a person included in a captured image; and an estimation position detection step of detecting an estimation position of a target object in the captured image using information relating to a position of each of the plurality of detected parts.

9. The control method described in 8, in which a reference information storage unit that stores reference information is connected in a communicable manner, in which the reference information associates position information of an object with part information relating to a position of each of a plurality of parts of a person who carries the object, in the part detection step, the part information relating to the position of each of the plurality of parts is generated, and in the estimation position detection step, the reference information that indicates the part information having high similarity to the generated part information is extracted from the reference information storage unit, and the estimation position of the target object is decided based on the position information of the object indicated in the extracted reference information.

10. The control method described in 9, in which the part information is vector data in which any one of coordinates of each of a plurality of parts, a direction vector connecting each of a plurality of parts and an adjacent part, an orientation of the direction vector, and an angle between straight lines connecting adjacent parts is listed, and in the estimation position detection step, a distance between vector data indicated by the generated part information and vector data indicated by the part information included in the reference information is computed, and the reference information in which the distance computed for the corresponding part information is equal to or less than a threshold value or the reference information in which magnitude of the distance computed for the corresponding part information is equal to or lower than a predetermined rank in an ascending order is extracted as the reference information indicating the part information having high similarity to the generated part information.

11. The control method described in 9 or 10, in which the position information of the object indicated by the reference information is matrix data representing presence or absence of the target object in each pixel of an image including the person who carries the target object, and in the estimation position detection step, the estimation position is detected by superimposing the matrix data indicated by the respective extracted reference information.

12. The control method described in any one of 9 to 11, further including:

a kind information acquisition step of acquiring kind information indicating a kind of the target object, in which the reference information associates a kind of an object, part information of a person who carries the object of the kind and position information of the object of the kind with one another, and in the estimation position detection step, the reference information that indicates the kind of the target object indicated by the kind information and indicates the part information having similarity to the part information generated in the part detection step equal to or greater than a threshold value is extracted from the reference information storage unit, and the estimation position of the target object is decided based on the position information of the target object indicated in the extracted reference information.

13. The control method described in any one of 9 to 12, in which at least one part is a joint.

14. The control method described in any one of 8 to 13, further including:

a candidate region detection step of detecting one or more candidate regions, each of which is an image region estimated to represent the target object, from the captured image based on an image feature of the target object; and a determination step of determining an object region, which is an image region representing the target object, from among the one or more detected candidate regions based on the one or more detected candidate regions and the estimation position.

15. A program causing a computer to execute each step of the control method described in any one of 7 to 14.

What is claimed is:

1. An information processing apparatus comprising:
at least one memory configured to store one or more instructions; and at least one processor configured to execute the one or more instructions to:

detect a plurality of parts constituting a body of a person included in a captured image; and detect an estimation position of a target object in the captured image using information indicating a relative positional relationship between the plurality of detected parts, wherein the information processing apparatus is connected to a reference information storage unit that stores reference information in a communicable manner, wherein the reference information associates position information of an object with part information relating to a position of each of a plurality of parts of a person who carries the object, wherein the processor is further configured to execute the one or more instructions to:

generate part information relating to the position of each of the plurality of parts, extract the reference information that indicates the part information having similarity to the generated part information, and decide the estimation position of the target object based on the position information of the object indicated in the extracted reference information.

2. The information processing apparatus according to claim 1, wherein the processor is further configured to execute the one or more instructions to:

detect one or more candidate regions, each of which is an image region estimated to represent the target object, from the captured image based on an image feature of the target object; and determine an object region, which is an image region representing the target object, from among the one or more detected candidate regions based on the one or more detected candidate regions and the estimation position.

3. A non-transitory storage medium storing a program causing a computer to execute each step of the control method according to claim 2.

4. The information processing apparatus according to claim 1, wherein the processor is further configured to execute the one or more instruction to detect the estimation position of the target object based on reference information associating information indicating a relative positional relationship between the plurality of parts constituting a body of a person with information indicating a position of the target object.

5. The information processing apparatus according to claim 1, wherein the part information is vector data in which any one of coordinates of each of a plurality of parts, a direction vector connecting each of a plurality of parts and an adjacent part, an orientation of the direction vector, and an angle between straight lines connecting adjacent parts is listed, and wherein the processor is further configured to execute the one or more instructions to:

compute a distance between vector data indicated by the generated part information and vector data indicated by the part information included in the reference information, and extract, as the reference information indicating the part information having high similarity to the generated part information, the reference information in which the distance computed for the corresponding part information is equal to or less than a threshold value or the reference information in which magnitude of the distance computed for the corresponding part information is equal to or higher than a predetermined rank in an ascending order.

6. The information processing apparatus according to claim 1, wherein the position information of the object indicated by the reference information is matrix data representing presence or absence of the target object in each pixel of an image including the person who carries the target object, and wherein the processor is further configured to execute the one or more instructions to detect the estimation position by superimposing the matrix data indicated by the respective extracted reference information.

7. The information processing apparatus according to claim 1, wherein the processor is further configured to execute the one or more instructions to acquire kind information indicating a kind of the target object, wherein the reference information associates a kind of an object, part information of a person who carries the object of the kind and position information of the object of the kind with one another, and wherein the processor is further configured to execute the one or more instructions to extract the reference information that indicates the kind of the target object indicated by the kind information and indicates the part information having similarity to the part information generated by the part detection unit equal to or greater than a threshold value, and decide the estimation position of the target object based on the position information of the target object indicated in the extracted reference information.

8. The information processing apparatus according to claim 1, wherein at least one part is a joint.

9. A control method that is executed by a computer, the control method comprising:

detecting a plurality of parts constituting a body of a person included in a captured image; and detecting an estimation position of a target object in the captured image using information indicating a relative positional relationship between the plurality of detected parts, wherein a reference information storage unit that stores reference information is connected in a communicable manner, wherein the reference information associates position information of an object with part information relating to a position of each of a plurality of parts of a person who carries the object, parting information relating to the position of each of the plurality of parts is generated, and the reference information that indicates the part information having similarity to the generated part information is extracted from the reference information storage unit, and the estimation position of the target object is decided based on the position information of the object indicated in the extracted reference information.

10. The control method according to claim 9, wherein the part information is vector data in which any one of coordinates of each of a plurality of parts, a direction vector connecting each of a plurality of parts and an adjacent part, an orientation of the direction vector, and an angle between straight lines connecting adjacent parts is listed, and a distance between vector data indicated by the generated part information and vector data indicated by the part information included in the reference information is computed, and the reference information in which the distance computed for the corresponding part information is equal to or less than a threshold value or the reference information in which magnitude of the distance computed for the corresponding part information is equal to or higher than a predetermined rank in an ascending order is extracted as the reference information indicating the part information having high similarity to the generated part information.

11. The control method according to claim 9, wherein the position information of the object indicated by the reference information is matrix data representing presence or absence of the target object in each pixel of an image including the person who carries the target object, and the estimation position is detected by superimposing the matrix data indicated by the respective extracted reference information.

12. The control method according to any one of claim 9, further comprising:

acquiring kind information indicating a kind of the target object, wherein the reference information associates a kind of an object, part information of a person who carries the object of the kind and position information of the object of the kind with one another, and the reference information that indicates the kind of the target object indicated by the kind information and indicates the part information having similarity to the part information generated in the part detection step equal to or greater than a threshold value is extracted from the reference information storage unit, and the estimation position of the target object is decided based on the position information of the target object indicated in the extracted reference information.

13. The control method according to claim 9, wherein at least one part is a joint.

14. The control method according to claim 9, further comprising:

detecting one or more candidate regions, each of which is an image region estimated to represent the target object, from the captured image based on an image feature of the target object; and determining an object region, which is an image region representing the target object, from among the one or more detected candidate regions based on the one or more detected candidate regions and the estimation position.

* * * * *